US007752124B2

(12) United States Patent
Green et al.

(10) Patent No.: US 7,752,124 B2
(45) Date of Patent: Jul. 6, 2010

(54) SYSTEM AND METHOD FOR AUTOMATED LOAN COMPLIANCE ASSESSMENT

(75) Inventors: Timothy T. Green, Ladera Ranch, CA (US); Albert V. Ogrodski, Jr., Anaheim, CA (US); Frank D. Tuttle, Irvine, CA (US)

(73) Assignee: Mavent Holdings, Inc., Irvine, CA (US)

( * ) Notice: Subject to any disclaimer, the term of this patent is extended or adjusted under 35 U.S.C. 154(b) by 2099 days.

(21) Appl. No.: 10/249,784

(22) Filed: May 7, 2003

(65) Prior Publication Data
US 2003/0229581 A1 Dec. 11, 2003

Related U.S. Application Data

(63) Continuation-in-part of application No. 09/518,837, filed on Mar. 3, 2000, now Pat. No. 7,412,417.

(51) Int. Cl.
*G06Q 40/00* (2006.01)
(52) U.S. Cl. ............................................ 705/38; 705/30
(58) Field of Classification Search ...................... 705/1, 705/10–44
See application file for complete search history.

(56) References Cited

U.S. PATENT DOCUMENTS

| 5,699,527 | A  | * | 12/1997 | Davidson ...................... 705/38 |
| 6,643,625 | B1 | * | 11/2003 | Acosta et al. .................. 705/38 |
| 2001/0037287 | A1 | | 11/2001 | Broadbent |
| 2001/0047326 | A1 | | 11/2001 | Broadbent |
| 2002/0023109 | A1 | | 2/2002 | Lederer, Jr. |

FOREIGN PATENT DOCUMENTS

WO    WO 01/69489 A2    9/2001

OTHER PUBLICATIONS

Britt, Phil, "A Look at Compliance Software", Americaa's Community Banker, Sep. 7, 9, 16, 1998, Dialog file 148, Accession No. 11583469.*
Purcell "Compliance and fee revenue made easy", Bank Systems & Technology, New York, vol. 31, Issue 8, p. 41, Aug. 1994.*
Muolo, Paul, "Merging on the Information Highway", USBanker, New York, Mar. 1995, vol. 105, Issue 3, p. 79.*
PR NewsWire, "InterFirst Chooses Stewart Online for all Mortgage Loan Documentation", PR NewsWire, New York, Jul. 20, 1998, p. 1.*

* cited by examiner

*Primary Examiner*—Frantzy Poinvil
(74) *Attorney, Agent, or Firm*—Taylor Russell & Russell, PC

(57) ABSTRACT

An automated system and method for reviewing and assessing compliance with legal compliance requirements for loan applications. Loan application data is extracted from client loan origination systems and transmitted as a loan information file over a secure communication network to an automated compliance assessment system server where the loan information file is audited for compliance with Federal, state, and local legal compliance requirements. The loan information file is reviewed for legal compliance requirements imposed by Federal, State, and local jurisdictions, as well as licensing requirements that the client loan company and related personnel must satisfy. The results of the audit process are transmitted over a secure communication network to the client loan company, with areas of noncompliance indicated. The automated compliance assessment system server also stores rules data derived from legal compliance requirements, license data derived from regulatory requirements, system setup data and supplemental system application data.

42 Claims, 28 Drawing Sheets

```xml
<?xml version="1.0" encoding="UTF-8" ?>
<DataPackage>
    <DataPackageID />
    <DataPackageDate>2003-02-04T19:08:28.261</DataPackageDate>
    <Customer>
        <CustomerID>1234567890</CustomerID>
        <CustomerPassword>password</CustomerPassword>
        <UserName>Al Ogrodski</UserName>
        <UserEmail>al.ogrodski@2comply.com</UserEmail>
        <PrinterName>westerprn07</PrinterName>
    </Customer>
    <ServiceData ServiceDataID="1">
        <ServiceGroupCode>DemoAuditGroup</ServiceGroupCode>
        <ServiceDataType>Mortgage</ServiceDataType>
        <MortgageData>
            <LoanDetail>
                <LoanIdentifier>ABC-OH-001</LoanIdentifier>
                <AmortizationTerm>360</AmortizationTerm>
                    .
                    .   {Descriptive Information, APR, Property Type, etc.}
                    .
                <FinanceChargeAmount>0.0</FinanceChargeAmount>
                <PreviousPPPAmount />
            </LoanDetail>
            <Fee>
                <CustomerFeeID>F1101_10</CustomerFeeID>
                <FeeID>51</FeeID>
                <HUDID>1101</HUDID>
                <FeeText>Settlement/Closing Fee</FeeText>
                    .
                    .
                    .
                <ProviderFeeAmount>0.0</ProviderFeeAmount>
                <Section32AffiliateFlag>false</Section32AffiliateFlag>
            </Fee>
                    .   {Fee Information for Title Insurance Binder, Title
                    .    Insurance, Recording Fees, Origination Fees,
                    .    Appraisal/Final Inspection-Broker Fees, Miscellaneous
                    .    Broker Fees, Process/Administration Fees-Broker}
            </Fee>
            <Impound>
                <CustomerFeeID>F1001_10</CustomerFeeID>
                <FeeID>41</FeeID>
                <HUDID>1001</HUDID>
                    .   {Impound Fee Information for Escrowed Hazard
                    .    Insurance, and Escrowed County Taxes}
```

FIGURE 5A

```xml
</Impound>
<Borrower>
    <BorrowerType>Individual</BorrowerType>
    <BorrowerFirstName>John</BorrowerFirstName>
    <BorrowerMiddleName />
    <BorrowerLastName>Doe</BorrowerLastName>
    <BorrowerGenerationCode />
    <Address1>399 Noah Ave</Address1>
    <Address2 />
    <City>Akron</City>
    <StateCode>OH</StateCode>
    <ZipCode>44320</ZipCode>
    <CoBorrowerFirstName />
    <CoBorrowerMiddleName />
    <CoBorrowerLastName />
    <CoBorrowerGenerationCode />
</Borrower>
<PrePaymentPenalty>
    <PPPFlag>false</PPPFlag>
    <AggregateLimitPercent>0.0</AggregateLimitPercent>
         .
         .
         .
    </PrePaymentPenaltyPeriod>
</PrePaymentPenalty>
<LateFee>
    <MinimumLateFeeAmount>5.0</MinimumLateFeeAmount>
    <LateFeeAmount>39.134</LateFeeAmount>
    <LateFeePercent>5.0</LateFeePercent>
    <LateFeeGracePeriod>15</LateFeeGracePeriod>
</LateFee>
<ProposedHousing>
    <PaymentAmount>782.68</PaymentAmount>
    <OtherPaymentAmount>0.0</OtherPaymentAmount>
    <HazardInsuranceAmount>32.25</HazardInsuranceAmount>
    <RealEstateTaxAmount>100.0</RealEstateTaxAmount>
    <MIAmount>88.46</MIAmount>
    <HOAAmount>0.0</HOAAmount>
    <OtherAmount>0.0</OtherAmount>
</ProposedHousing>
<MIRenewal>
    <MIRenewalID>1</MIRenewalID>
    <MIRate>0.96</MIRate>
    <MIPeriod>120</MIPeriod>
</MIRenewal>
<MIRenewal>
    <MIRenewalID>2</MIRenewalID>
```

FIGURE 5B

```xml
<MIRate>0.2</MIRate>
<MIPeriod>240</MIPeriod>
</MIRenewal>
- <License>
    <CustomerCompanyIdentifier>CMG7751</CustomerCompanyIdentifier>
    <CompanyIdentifier />
    <LicenseEntityCode>Broker</LicenseEntityCode>
    <Name>CLINTONVILLE MORTGAGE GROUP, LTD.</Name>
    <DBAName>CLINTONVILLE MORTGAGE GROUP, LTD.</DBAName>
    <Address1>4319 INDIANOLA AVE.</Address1>
    <Address2 />
    <City>COLUMBUS</City>
    <StateCode>OH</StateCode>
    <ZipCode>43214</ZipCode>
    <LicenseStateCode>OH</LicenseStateCode>
  </License>
- <HMDA>
    <LoanIdentifier>ABC-OH-001</LoanIdentifier>
    <ApplicationReceivedDate>20021031</ApplicationReceivedDate>
    <LoanTypeCode>1</LoanTypeCode>
            .
            .
            .
    <DenialReason1Code />
    <DenialReason2Code />
    <DenialReason3Code />
  </HMDA>
- <Fee>
        .    {Fee Information for Flood Certification and Tax
        .     Service Contract}
        .
  </Fee>
 </MortgageData>
</ServiceData>
</DataPackage>
```

FIGURE 5C

```xml
<?xml version="1.0" encoding="UTF-8" ?>
<DataPackage>
  <DataPackageID />
  <DataPackageDate>2003-02-04T19:08:28.261</DataPackageDate>
  <Customer>
    <CustomerID>1234567890</CustomerID>
    <CustomerPassword>password</CustomerPassword>
    <UserName>Al Ogrodski</UserName>
    <UserEmail>al.ogrodski@2comply.com</UserEmail>
    <PrinterName>westerprn07</PrinterName>
  </Customer>
  <ServiceData ServiceDataID="1">
    <ServiceGroupCode>DemoAuditGroup</ServiceGroupCode>
    <ServiceDataType>Mortgage</ServiceDataType>
    <MortgageData>
             .
             .   {This Information is Identical to that Shown in Figure 5}
             .
    </MortgageData>
    <ServiceResponse>        {The Following is a Result of Compliance
      <ProviderData>          Assessment Process}
        <Name>Assured Regulatory Compliance, Inc.</Name>
        <Address1>3 Park Plaza, Suite 700</Address1>
        <Address2 />
        <City>Irvine</City>
        <StateCode>CA</StateCode>
        <ZipCode>92614</ZipCode>
        <PhoneNumber>(949) 474-4712</PhoneNumber>
        <FaxNumber>(949) 474-4701</FaxNumber>
        <ContactName>Scott McNulla</ContactName>
      </ProviderData>
      <CustomerData>
        <Name>ABC Lender</Name>
        <Address1>123 Orange Drive</Address1>
        <Address2 />
        <City>Orange</City>
        <StateCode>CA</StateCode>
        <ZipCode>12345</ZipCode>
        <PhoneNumber />
        <FaxNumber>(714) 998-1234</FaxNumber>
        <ContactName>Mary Jones</ContactName>
      </CustomerData>
      <AuditGroup>
        <AuditGroupCode>General Validation</AuditGroupCode>
        <AuditGroupDescription>SDS Broker License
          Data</AuditGroupDescription>
        <AuditGroupStatus>PASS</AuditGroupStatus>
      </AuditGroup>
```

FIGURE 6A

```xml
- <AuditGroup>
    <AuditGroupCode>General Validation</AuditGroupCode>
    <AuditGroupDescription>SDS Customer License
        Data</AuditGroupDescription>
    <AuditGroupStatus>PASS</AuditGroupStatus>
  </AuditGroup>
- <AuditGroup>
    <AuditGroupCode>General Validation</AuditGroupCode>
    <AuditGroupDescription>SDS Fee
        Data</AuditGroupDescription>
    <AuditGroupStatus>PASS</AuditGroupStatus>
  </AuditGroup>
- <AuditGroup>
    <AuditGroupCode>General Validation</AuditGroupCode>
    <AuditGroupDescription>SDS Impound
        Data</AuditGroupDescription>
    <AuditGroupStatus>PASS</AuditGroupStatus>
  </AuditGroup>
- <AuditGroup>
    <AuditGroupCode>AuditFees</AuditGroupCode>
    <AuditGroupDescription>Fee Audit</AuditGroupDescription>
    <AuditGroupStatus>PASS</AuditGroupStatus>
  </AuditGroup>
- <AuditGroup>
    <AuditGroupCode>High Cost Audit (OH)</AuditGroupCode>
    <AuditGroupDescription>This audit determines if the loan is
        a high cost mortgage.</AuditGroupDescription>
    <AuditGroupStatus>PASS</AuditGroupStatus>
  </AuditGroup>
- <AuditGroup>
    <AuditGroupCode>High Cost Audit
        (Cleveland)</AuditGroupCode>
    <AuditGroupDescription>This audit determines if the loan is
        a high cost mortgage.</AuditGroupDescription>
    <AuditGroupStatus>PASS</AuditGroupStatus>
  </AuditGroup>
- <AuditGroup>
    <AuditGroupCode>High Cost Audit (FED)</AuditGroupCode>
    <AuditGroupDescription>This audit determines if the loan is
        a high cost mortgage.</AuditGroupDescription>
    <AuditGroupStatus>PASS</AuditGroupStatus>
  </AuditGroup>
- <AuditGroup>
    <AuditGroupCode>AuditLicense</AuditGroupCode>
    <AuditGroupDescription>License Audit -
        Broker(NL)</AuditGroupDescription>
    <AuditGroupStatus>PASS</AuditGroupStatus>
  </AuditGroup>
```

FIGURE 6B

```xml
- <AuditGroup>
    <AuditGroupCode>AuditLicense</AuditGroupCode>
    <AuditGroupDescription>License Audit -
       Lender(NL)</AuditGroupDescription>
    <AuditGroupStatus>PASS</AuditGroupStatus>
  </AuditGroup>
- <AuditGroup>
    <AuditGroupCode>AuditStateRules</AuditGroupCode>

<AuditGroupDescription>AuditStateRules</AuditGroupDescr
       iption>
    <AuditGroupStatus>PASS</AuditGroupStatus>
  </AuditGroup>
- <AuditGroup>
    <AuditGroupCode>AuditHMDA</AuditGroupCode>
    <AuditGroupDescription>HMDA Audit</AuditGroupDescription>
    <AuditGroupStatus>PASS</AuditGroupStatus>
  - <AuditItem>
      <AuditDescription>HMDA - Validate MSA
         Code</AuditDescription>
      <AuditResult>MSA Number '1840' does not match with
         value returned by geocoder (0080)</AuditResult>
      <AuditStatus>WARNING</AuditStatus>
    </AuditItem>
  - <AuditItem>
      <AuditDescription>HMDA - Validate County
         Code</AuditDescription>
      <AuditResult>County Code '049' does not match with
         value returned by geocoder (153)</AuditResult>
      <AuditStatus>WARNING</AuditStatus>
    </AuditItem>
  - <AuditItem>
      <AuditDescription>HMDA - Validate Census Tract
         Number</AuditDescription>
      <AuditResult>Census Tract Number 'NA' does not
         match with value returned by geocoder
         (5065.00)</AuditResult>
      <AuditStatus>WARNING</AuditStatus>
    </AuditItem>
  </AuditGroup>
- <AuditGroup>
    <AuditGroupCode>Customer Fee Rule Set Review
       (OH)</AuditGroupCode>
    <AuditGroupDescription>This reviews the loan fees to
       determines if they satisfy the fee
       rules.</AuditGroupDescription>
    <AuditGroupStatus>WARNING</AuditGroupStatus>
  - <AuditItem>
      <AuditDescription>Fee Rule Review</AuditDescription>
```

FIGURE 6C

```xml
<AuditResult>The amount being charged on the fee 812 Wire/Chck Fee To
    Lender of $0.0 is less than the fee amount, $35.0, established by the
    management for Wholesale First Liens in OH.</AuditResult>
  <AuditStatus>WARNING</AuditStatus>
</AuditItem>
<AuditItem>
  <AuditDescription>Fee Rule Review</AuditDescription>
  <AuditResult>The amount being charged on the fee
     811 Tax Service Contract of $0.0 is less than the fee
     amount, $79.0, established by the management for
     Wholesale First Liens in OH.</AuditResult>
  <AuditStatus>WARNING</AuditStatus>
</AuditItem>
<AuditItem>
  <AuditDescription>Fee Rule Review</AuditDescription>
  <AuditResult>The amount being charged on the fee
     810 Doc Prep / Funding Fee To Lender of $0.0 is
     less than the fee amount, $230.0, established by
     the management for Wholesale First Liens in
     OH.</AuditResult>
  <AuditStatus>WARNING</AuditStatus>
</AuditItem>
<AuditItem>
  <AuditDescription>Fee Rule Review</AuditDescription>
  <AuditResult>The amount being charged on the fee
     816 Underwriting Fee of $0.0 is less than the fee
     amount, $250.0, established by the management
     for Wholesale First Liens in OH.</AuditResult>
  <AuditStatus>WARNING</AuditStatus>
</AuditItem>
</AuditGroup>
<GeoCodeData>
  <MSANumber>0080</MSANumber>
  <StateFIPSCode>39</StateFIPSCode>
  <CountyFIPSCode>153</CountyFIPSCode>
  <CensusTractNumber>5065.00</CensusTractNumber>
</GeoCodeData>
<HighCostData>
  <FederalFlag>false</FederalFlag>
  <FederalLimitRate>13.04</FederalLimitRate>
  <FederalLimitFeeAmount>8506.4</FederalLimitFeeAmount>
  <FederalCustomerRate>8.597</FederalCustomerRate>

<FederalCustomerFeeAmount>4250.0</FederalCustomerFeeAmount>
  <StateFlag>false</StateFlag>
  <StateLimitRate>15.04</StateLimitRate>
  <StateLimitFeeAmount>8506.4</StateLimitFeeAmount>
```

FIGURE 6D

```xml
            <StateCustomerRate>8.597</StateCustomerRate>
         <StateCustomerFeeAmount>4250.0</StateCustomerFeeAmount>
         <LocalFlag>false</LocalFlag>
         <LocalLimitRate>10.04</LocalLimitRate>
         <LocalLimitFeeAmount>4253.2</LocalLimitFeeAmount>
         <LocalCustomerRate>8.597</LocalCustomerRate>
         <LocalCustomerFeeAmount>4250.0</LocalCustomerFeeAmount>
      </HighCostData>
    - <ApplicableLicense>
      - <ApplicableLicenseDetail>
           <LicenseEntityCode>Broker</LicenseEntityCode>
           <StateCode>OH</StateCode>
           <LicenseType>NL</LicenseType>
           <ExemptionFlag>false</ExemptionFlag>
        </ApplicableLicenseDetail>
      - <ApplicableLicenseDetail>
           <LicenseEntityCode>Lender</LicenseEntityCode>
           <StateCode>OH</StateCode>
           <LicenseType>NL</LicenseType>
           <ExemptionFlag>false</ExemptionFlag>
        </ApplicableLicenseDetail>
      </ApplicableLicense>
    </ServiceResponse>
  </ServiceData>
</DataPackage>
```

Showing 1 - 16 of 62    All - A B C D E F G H I J K L M N O P Q R S T U V W X Y Z

| JURISDICTION | AGENCY |
|---|---|
| | Unassigned |
| Alaska | Alaska Division of Banking, Securities & Corporations |
| Alaska | Alaska Division of Occupational Licensing |
| Alabama | Alabama Real Estate Commission |
| Alabama | Alabama State Banking Department Center for Commerce |
| Arkansas | Arkansas Securities Department |
| Arizona | Arizona State Banking Department |
| California | California Department of Corporations |
| California | California Department of Real Estate |
| Colorado | Colorado Attorney General's Office UCC Code Unit |
| Connecticut | Connecticut Department of Banking Consumer Credit Division |
| District of Columbia | District of Columbia Department of Banking & Financial Institutions |
| Delaware | Delaware Office of State Banking Commissioner |
| Florida | Florida Department of Banking Division of Finance and Securities |
| Georgia | Georgia Department of Banking and Finance Mortgage Division |

Showing 1 - 16 of 62

DISPLAY: ACT  ⊗ Log Out

Showing 1 - 20 of 207 All - A B C D E F G H I J K L M N O P Q R S T U V W X Y Z   ►NEXT

| JURISDICTION | ACT NAME |
|---|---|
| Alaska | Alaska Interest and Usury Provisions |
| Alaska | Alaska Property Provisions |
| Alaska | Alaska Small Loans Act |
| Alabama | Consumer Credit Act |
| Alabama | Interest-Usury Statute |
| Alabama | Mortgage Brokers Licensing Act |
| Arkansas | Mortgage Loan Companies and Loan Brokers Act |
| Arkansas | Property Laws |
| Arkansas | Arkansas Interest and Usury Provisions |
| Arizona | Mortgage Brokers and Mortgage Bankers Provisions |
| Arizona | Usury Provisions |
| Arizona | Consumer Loan Act |
| Arizona | Advance Fee Loan Broker Act |
| California | California Residential Mortgage Lending Act |
| California | California Real Estate Law |
| California | California Finance Lenders Law |

►NEXT

Showing 1 - 20 of 207

DISPLAY LICENSE — 1530

Showing 1 - 20 of 170 All - A B C D E F G H I J K L M N O P Q R S T U V W X Y Z

| JURISDICTION | LICENSE |
|---|---|
| Alaska | No License Required |
| Alaska | Small Loan Company |
| Alabama | Consumer Finance License |
| Alabama | No License Required |
| Alabama | Mortgage Broker License |
| Arkansas | Mortgage Loan Company |
| Arizona | Advance Fee Loan Broker |
| Arizona | Mortgage Banker |
| Arizona | Mortgage Broker |
| Arizona | Consumer Lender |
| California | California Finance Lender |
| California | Residential Mortgage Lender |
| California | Brokers |
| California | Corporations |
| California | California Finance Broker |
| Colorado | No License Required |
| Colorado | Supervised Lender's License |

Showing 1 - 20 of 170

AUDIT SEARCH BY LOAN NUMBER

Loan Number:
Customer: --Select One--

FIGURE 19B

AUDIT ADVANCED SEARCH

Loan Number:
Branch: --Select One--
Application Date (YYYY-MM-DD):
Submit Date (YYYY-MM-DD):
Loan Status: --Select One--
Audit Status: --Select One--
Customer:

DISPLAY USER

Showing 1 - 12 of 31   All - A B C D E F G H I J K L M N O P Q R S T U V W X Y Z

| USER FULL NAME | USER NAME | COMPANY | USER ROLE | STATUS |
|---|---|---|---|---|
| Al Ogrady | al.ogrady | Regulatory Compliance Company, Inc. | Admin | Active |
| Antonio Mediera | antonio.mediera | Mortgage Funding Company, Inc. | Broker Group | Inactive |
| Barbara Major | barbara.major | Mortgage Funding Company, Inc. | Management | Active |
| Becky Parson | becky.parson | Mortgage Funding Company, Inc. | Management | Inactive |
| Brandon LeBlanc | brandon.leblanc | Regulatory Compliance Company, Inc. | Admin | Active |
| Chrishinda Harris | chrishinda.harris | Mortgage Funding Company, Inc | Broker Group | Inactive |
| Christine Galvin | christine.galvin | Regulatory Compliance Company, Inc. | View Only | Active |
| Damone Green | damone.green | Mortgage Funding Company, Inc. | Broker Group | Inactive |
| David Vincent | david.vincent | Mortgage Funding Company, Inc. | Management | Active |
| Deborah Weiss | deborah.weiss | Mortgage Funding Company, Inc. | Broker Group | Inactive |

Showing 1 - 12 of 31

DISPLAY USER ROLE                All - A B C D E F G H I J K L M N O P Q R S T U V W X Y Z

Showing 1 - 7 of 7

| NAME | DESCRIPTION |
|---|---|
| Compliance Co. Admin | Full Access for Compliance Co. administrators. |
| Compliance Co. Audit Search | Audit Search access for Compliance Co. employees. |
| Compliance Co. Broker Management | Limited access for Compliance Co. Broker Management group. |
| Compliance Co. Management | Access for Compliance Co. management. |
| Compliance Co. View Only | View access for Compliance Co. employees. |
| Mortgage Co. Broker Group | Limited access for Mortgage Co. Broker Management group. |
| Mortgage Co. Management | Limited access for Mortgage Co. management team. |

Showing 1 - 7 of 7

FIGURE 22

SYSTEM AND METHOD FOR AUTOMATED LOAN COMPLIANCE ASSESSMENT

CROSS REFERENCE TO RELATED APPLICATIONS

This application is a continuation-in-part of application Ser. No. 09/518,837 filed Mar. 3, 2000, now U.S. Pat. No. 7,412,417, issued on Aug. 12, 2008.

BACKGROUND OF INVENTION

The present invention relates generally to systems and methods for lending transactions involving loan initiation. More particularly, the invention is a system and method for ensuring that loans provided by lending institutions comply with the most current federal, state and local regulations. This is accomplished by extracting data from a lending institution's loan origination system and forwarding the data over a secure communication connection to a server located at a service provider's site. The server archives the lending institution's data and processes the data to assess whether every mortgage loan originated by the institution complies with all federal, state and local regulations applicable to each loan initiation.

As the standard of living for more people has increased over the last decade, many have sought to own their own home. This has brought an increase in the number of home mortgage loan applications. There are tens of millions of mortgage loan applications processed every year resulting in over a trillion dollars in new residential real estate loans. It is estimated that between five and six percent of the principal amount of these loans was paid out in fees, charges and expenses to consummate these transactions, amounting to between $60 and $72 billion. To protect consumers involved in these credit transactions, the Federal government as well as state and local municipalities have enacted laws and regulations that impose requirements on institutions and personnel involved in the business of originating and closing mortgage loans. These laws and regulations establish transactional standards and disclosure requirements that are enforced by state and Federal agencies. As new laws, regulations, licenses and rules are added over time, mortgage loan applications have become more varied, complex and prone to error, resulting in an increase in exposure to non-compliance liabilities of the institutions that process these applications. With the growing complexity of the mortgage loan industry, consumers have sometimes been subjected to compliance errors, overcharges and careless lending practices.

Federal and state regulators are conducting increasingly aggressive policing campaigns to ensure compliance by the mortgage industry. These efforts have significantly increased the costs for non-compliance in terms of monetary penalties and legal expenses, as well as in terms of tarnished reputations to the lending institutions. Because of the substantial growth in Internet and multi-state lending activities, the potential for serious compliance violations is likely to increase along with a corresponding increase in compliance scrutiny and enforcement activities by Federal and state regulatory agencies. The mortgage industry, including mortgage-backed securities investors, face the prospect of significant losses if they are forced to refund fees and charges, repurchase noncompliant loans, and pay civil and criminal penalties. To counter these potential losses, the industry will incur increased expenses associated with compliance audits and compliance policies, procedures and reporting.

In order to overcome these problems and to satisfy regulatory compliance requirements, institutions offering mortgage loans have attempted to audit loan compliance on a manual basis. This approach results in a tedious, time-consuming and costly process that allows only a small statistical sample of loan applications to be examined for compliance with requirements. The results of this process are also oftentimes inconsistent due to factors such as varying degrees of understanding, differences in interpretation and processing errors. With greater competition in the mortgage loan market, there is also a strong need to reduce the cost of regulatory compliance as well as to reduce penalties for failure to meet compliance requirements. Some mortgage companies have attempted to employ risk management techniques, which have proved inadequate as a solution to the compliance and related liability problems.

While the home mortgage loan industry is probably more regulated than other industries, the compliance difficulties are also encountered in many other areas. Other applications where automated compliance assessment would reduce costs and speed transaction processing include automobile and other consumer loans.

SUMMARY OF INVENTION

The present invention provides an automated system and method for ensuring that all data contained in the loan origination system for every loan application of a subscribing loan institution is in compliance with laws, regulations and other requirements applicable to each particular loan initiation and the location of the property. It is an expert system that provides auditing assessment capabilities for evaluating compliance of real estate and other loans with multi-jurisdictional regulatory compliance requirements. The invention provides compliance assurance for the borrowing public, the lending industry, Federal and state regulatory agencies, and the mortgage securities investment community. The invention comprises an automated expert system that extracts data from a lender's loan origination system and verifies that all such data for every loan adheres to the most current Federal, state, local and other requirements, including the following:

Truth-In-Lending Act (TIL) Requirements

Real Estate Settlement Procedures Act (RESPA)

Home Mortgage Disclosure Act (HMDA)

Office of Foreign Asset Control (OFAC)

Home Ownership and Equity Protection Act (HOEPA)

Originator and Lender Licensing Requirements

State Rules, Loan Fees and APR Calculations Requirements

State and Local High Cost Calculations Requirements

Pedatory Lending Rules and Regulations

Any areas of noncompliance are identified as exceptions and presented to the lender for corrective action.

Although the invention may be used after funding of a loan is completed, it is designed to review loan file data prior to closing the loan to ensure that the data is free of clerical mistakes, calculation errors, interest/usury rate violations, finance charge restrictions, and prohibited practices, including but not limited to "high-cost" loan restrictions, loan term and amortization restrictions, restricted/prohibited charges and fees, late charge limitations, and prepayment penalty limitations that may lead to violations of applicable federal, state and local requirements. A review immediately prior to loan funding represents the last reasonable opportunity to detect errors and mistakes in a loan file before the loan creates potential liabilities for the originators, lenders and investors. The invention addresses enterprise level risk assessment in real time.

The data that is assessed by the present invention is contained within a loan origination system (LOS) maintained by a lending institution. While "loan origination system" is a term of art used in the loan origination industry, when used in the context of the present invention, "loan origination system" or LOS is to be construed more broadly than the term of art may imply, to include data from any other system that may be assessed by the present invention.

The invention operates by extracting data from a lending institution's loan origination system and forwarding the data over a secure communication connection to a compliance assessment server. The server archives the lending institution's data and processes the data to verify that every loan initiated by the institution complies with all applicable requirements. The server contains a rule-based expert system for processing the data and a database containing rules derived from federal, state and local regulations, licensing authorities and lending institution requirements, as well as supplemental customer, investor and industry data. The lending institution is notified and kept abreast of the compliance status of each loan application file. The current invention also periodically reviews the loan origination data up to the time the loan has been funded, assessing whether any changes or additions do not impact compliance with requirements. When instances of noncompliance are found, the invention notifies the lending institution and recommends corrective action, preventing noncompliant loans from being funded until corrective action is taken. A structured process is provided for adding and updating rules in the server database, as new compliance requirements are promulgated.

In an embodiment of the present invention, a computer implemented method for automated loan compliance assessment comprises the steps of extracting loan data from a client loan origination system, converting and formatting the extracted loan data, assessing compliance of the formatted loan data with legal compliance requirements by a compliance assessment server to form audit result data, and storing the audit result data. The method may further comprise initiating the step of extracting by means selected from the group consisting of an automatic service request and a manual service request. The step of converting and formatting may comprise converting and formatting the extracted loan data into a file readable by the compliance assessment server. The method may further comprise the steps of transmitting the formatted loan data over a secure communication network to the compliance assessment server, and transmitting the audit result data over the secure communication network to the client loan origination system. The secure communication network may be selected from the group consisting of a satellite communication network, a telephone communication network, a microwave transmission network, a radio communication network, a wireless telephone communication network, a cable network, and the Internet. The step of storing the audit result data comprises storing the audit result data in a results repository of the compliance assessment server and in a loan origination database of the loan origination system. The method may further comprise the step of displaying the audit result data on a user interface selected from the group consisting of a client loan origination system user interface, a customer user interface and a compliance assessment server user interface. The steps of extracting and converting may comprise the steps of initiating manual and automatic audit assessment requests using a loan origination system user interface, receiving the audit assessment request and extracting a loan data file from a loan origination system database, converting and formatting the loan data file as an Extensible Markup Language XML file, sending the formatted loan data file to a server processor for loan compliance assessment, receiving an audit results file from the server processor, parsing the audit results file and storing the audit results file in the loan origination system database, and displaying the parsed audit results file on the loan origination system user interface. The step of assessing compliance may comprise the steps of receiving the formatted loan data in an input queue as a loan data file from a client side interface, verifying the formatted loan data file schema and customer passwords, validating the compliance review request, conducting a rules assessment of the loan data file against applicable statutory rules stored in a rules repository, conducting a license assessment of the loan data file against applicable license requirements stored in a license repository, conducting an assessment of the loan data file against industry standards and guidelines stored in a supplemental data repository, appending the assessment results to the loan data file to form an audit result file, storing the audit result file in a results repository, and placing the audit result file in an output queue for sending to the client side interface. The method may further comprise the steps of creating license requirements for storing in a license repository, and creating statutory rules requirements for storing in a rules repository. The step of creating statutory rules requirements may comprise the steps of extracting legal interpretations from documented sources of legal compliance, creating rules from the legal interpretations expressed in plain English that reflect compliance requirements, converting the English rules into computer system syntax rules, and storing the indexed and referenced sources of legal compliance requirements, legal interpretations, English rules and system rules in a rules repository. A computer-readable medium may contain instructions for controlling a computer system to implement the method described above.

Another embodiment of the present invention is a computer implemented method for automated loan compliance assessment that comprises the steps of extracting loan data from a client loan origination system, converting and formatting the extracted loan data, transmitting the formatted loan data to a compliance assessment server for assessing compliance of the formatted loan data with legal compliance requirements to form an audit result data file, receiving the audit result data file from the compliance assessment server, and storing and displaying the audit result data file. A computer-readable medium may contain instructions for controlling a computer system to implement the method described above.

Yet another embodiment of the present invention is a computer implemented method for automated loan compliance assessment that comprises the steps of receiving an extracted loan data file from a client loan origination system, converting and formatting the extracted loan data file, assessing compliance of the formatted loan data file with legal compliance requirements by a compliance assessment server to form audit result data, storing the audit result data file, and sending the audit result data file to the client loan origination system. A computer-readable medium may contain instructions for controlling a computer system to implement the method described above.

A further embodiment of the present invention is a computer system for automated loan compliance assessment that comprises means for extracting loan data from a client loan origination system, means for converting and formatting the extracted loan data, means for assessing compliance of the formatted loan data with legal compliance requirements by a compliance assessment server to form audit result data, and database means for storing the audit result data. The means for extracting loan data and means for converting and formatting the extracted loan data may comprise a client side interface. The client side interface may comprise means for initiating manual and automatic audit assessment requests using a loan origination system user interface, means for receiving the audit assessment request and extracting a loan data file from a loan origination system database, means for converting and formatting the loan data file as an XML file, means for sending the formatted loan data file to a server processor for loan compliance assessment, means for receiving an audit results file from the server processor, means for parsing the audit results file and storing the audit results file in the loan origination system database, and a loan origination system user interface means for displaying the parsed audit results file. The means for sending the formatted loan data file and the means for receiving an audit results file may be a secure communication network selected from the group consisting of a satellite communication network, a telephone communication network, a microwave transmission network, a radio communication network, a wireless telephone communication network, a cable network, and the Internet. The means for assessing compliance may comprise a server processor. The server processor may comprise means for receiving the formatted loan data in an input queue as a loan data file from a client side interface, means for verifying the formatted loan data file schema and customer passwords, means for validating the compliance review request, means for conducting a rules assessment of the loan data file against applicable statutory rules stored in a rules repository, means for conducting a license assessment of the loan data file against applicable license requirements stored in a license repository, means for conducting a review of the loan data file against industry standards and guidelines stored in a supplemental data repository for adding missing data, means for appending the assessment results to the loan data file to form an audit result file, results repository means for storing the audit result file, and means for placing the audit result file in an output queue for sending to the client side interface. The means for receiving the formatted loan data file and the means for sending the audit results file may be a secure communication network selected from the group consisting of a satellite communication network, a telephone communication network, a microwave transmission network, a radio communication network, a wireless telephone communication network, a cable network, and the Internet. The means for conducting a rules assessment, a license assessment, and an industry standards and guidelines assessment may comprise an expert system. The system may further comprise means for creating license requirements for storing in a license repository, and means for creating statutory rules requirements for storing in a rules repository. The means for creating license requirements may be a license data processor comprising means for extracting licensing data compilations of applicable licenses and licensees from regulatory agencies, means for converting the licensing data compilations into license XML files, and license repository means for storing the indexed and referenced regulations, licensee data, license data and license XML files. The means for creating statutory rules requirements may be a legal rule builder comprising means for extracting legal interpretations from statutes, regulations, ordinances, administrative codes and guides, official interpretations, court decisions, and other sources of legal compliance requirements, means for creating rules from the legal interpretations expressed in plain English that reflect compliance requirements, means for converting the English rules into computer system syntax rules, and rules repository means for storing the indexed and referenced sources of legal compliance requirements, legal interpretations, English rules and system rules.

Another embodiment of the present invention is a computer system for automated loan compliance assessment that comprises means for extracting loan data from a client loan origination system, means for converting and formatting the extracted loan data, means for transmitting the formatted loan data over a secure communication network to the compliance assessment server for assessing compliance of the formatted loan data with legal compliance requirements to form an audit result data file, means for receiving the audit result data file over the secure communication network from the client loan origination system, and means for storing and displaying the audit result data file.

And yet another embodiment of the present invention is a computer system for automated loan compliance assessment that comprises means for receiving an extracted loan data file from a client loan origination system, means for converting and formatting the extracted loan data file, means for assessing compliance of the formatted loan data file with legal compliance requirements by a compliance assessment server to form audit result data, means for storing the audit result data file, and means for sending the audit result data file to the client loan origination system.

An additional embodiment of the present invention is a computer implemented method for displaying automated loan compliance assessment information that comprises the steps of displaying a tool bar having selectable tool bar title buttons, at least one of the selectable tool bar title buttons for selecting an audit search, positioning a cursor over the audit search tool bar title button for displaying a drop-down menu having selections of audit search type, at least one of the selections for searching by loan number, designating the audit search type by selecting the search by loan number selection for displaying a loan number window and a customer selection window, entering a loan number into the loan number window and selecting a customer in the customer selection window, and viewing displayed automated loan compliance assessment information for the selected loan number and customer. The positioning step may comprise positioning a cursor over the audit search tool bar title button for displaying a drop-down menu having selections of audit search type, at least one of the selections for advanced searching, the designating step may comprise designating the audit search type by selecting the advanced search selection for displaying a loan number window, a branch selection window, an application date window, a submit date window, a loan status window, an audit status selection window and a customer selection window, the entering step may comprise entering data into one of the displayed, and the viewing step may comprise viewing a displayed list of audits that match the data entered into the selected displayed window. The method may further comprise displaying a tool bar having selectable tool bar title buttons, at least one of the selectable tool bar title buttons for selecting a jurisdiction display, positioning a cursor over the jurisdiction tool bar title button and selecting the jurisdiction tool bar title button, and viewing a displayed list of jurisdictions where automated loan compliance assessment may be conducted. The method may further comprise displaying a tool bar having selectable tool bar title buttons, at least one of the selectable tool bar title buttons for selecting an agency display, positioning a cursor over the agency tool bar title button and selecting the agency tool bar title button, and viewing a displayed list of jurisdictions and associated agencies for regulating loan compliance. The method may further comprise displaying a tool bar having selectable tool bar title buttons, at least one of the selectable tool bar title buttons for selecting an act display, positioning a cursor over the act tool bar title button and selecting the act tool bar title button, and viewing a displayed list of jurisdictions and associated acts for regulating loan compliance. The method may further comprise displaying a tool bar having selectable tool bar title buttons, at least one of the selectable tool bar title buttons for selecting a license display, positioning a cursor over the license tool bar title button and selecting the license tool bar title button, and viewing a displayed list of jurisdictions and associated licenses required by personnel and entities engaged in loan processing activities. The method may further comprise displaying a tool bar having selectable tool bar title buttons, at least one of the selectable tool bar title buttons for selecting a tag display, positioning a cursor over the tag tool bar title button and selecting the tag tool bar title button, and viewing a displayed list of tag names, tag descriptions and tag types used in loan compliance assessment. The method may further comprise displaying a tool bar having selectable tool bar title buttons, at least one of the selectable tool bar title buttons for selecting a rule display, positioning a cursor over the rule tool bar title button and selecting the rule tool bar title button, and viewing a displayed list of rules used in loan compliance assessment. The method may further comprise displaying a tool bar having selectable tool bar title buttons, at least one of the selectable tool bar title buttons for selecting a rule header display, positioning a cursor over the rule header tool bar title button and selecting the rule header tool bar title button, and viewing a displayed list of rule headers used in loan compliance assessment. The method may further comprise displaying a tool bar having selectable tool bar title buttons, at least one of the selectable tool bar title buttons for selecting a reports display, positioning a cursor over the reports tool bar title button for displaying a drop-down menu having a selection of report types, the selection of report types including broker license exception, covered loan exception, daily exception, error exception, fee exception, geocode exception, high cost exception, Home Mortgage Disclosure Act HMDA exception, lender license exception, SDS exception, and state rule exception, designating the report type to be displayed by selecting a report type for displaying a date window and a customer selection window, entering a date into the date window and selecting a customer in the customer selection window, and viewing the displayed designated report type. The method may further comprise displaying a tool bar having selectable tool bar title buttons, at least one of the selectable tool bar title buttons for selecting an administration display, positioning a cursor over the administration tool bar title button for displaying a drop-down menu having selections of user setup and user role setup, designating a user setup to be displayed by selecting the user setup selection, and viewing the displayed designated user setup comprising a displayed list of user full names, user login names, user company names, user roles, and user status. The method may further comprise displaying a tool bar having selectable tool bar title buttons, at least one of the selectable tool bar title buttons for selecting an administration display, positioning a cursor over the administration tool bar title button for displaying a drop-down menu having selections of user setup and user role setup, designating a user role setup to be displayed by selecting the role setup selection, and viewing the displayed designated user role setup comprising a displayed list of user role names and associated descriptions.

BRIEF DESCRIPTION OF DRAWINGS

These and other features, aspects and advantages of the present invention will become better understood with regard to the following description, appended claims, and accompanying drawings wherein:

FIG. 5 shows an embodiment of a formatted loan file sent from the CSI to the SP for requesting a compliance assessment;

FIG. 6 shows an embodiment of a result file sent from the SP to the CSI containing results of a compliance assessment;

FIG. 13 depicts a screen shot showing a list of agencies in each jurisdiction that promulgates regulations;

FIG. 14 depicts a screen shot showing a list of acts in each jurisdiction that contain compliance requirements;

FIG. 15 depicts a screen shot showing a list of license requirements in each jurisdiction;

FIG. 19A depicts a screen shot showing a data entry screen for searching for an existing audit by loan number;

FIG. 19B depicts a screen shot showing a data entry screen for searching for an existing audit using an advanced search;

FIG. 21 depicts a screen shot showing a list of users who are allowed access to the system; and FIG. 22 depicts a screen shot showing a list of user role names.

DETAILED DESCRIPTION

Figure 1:
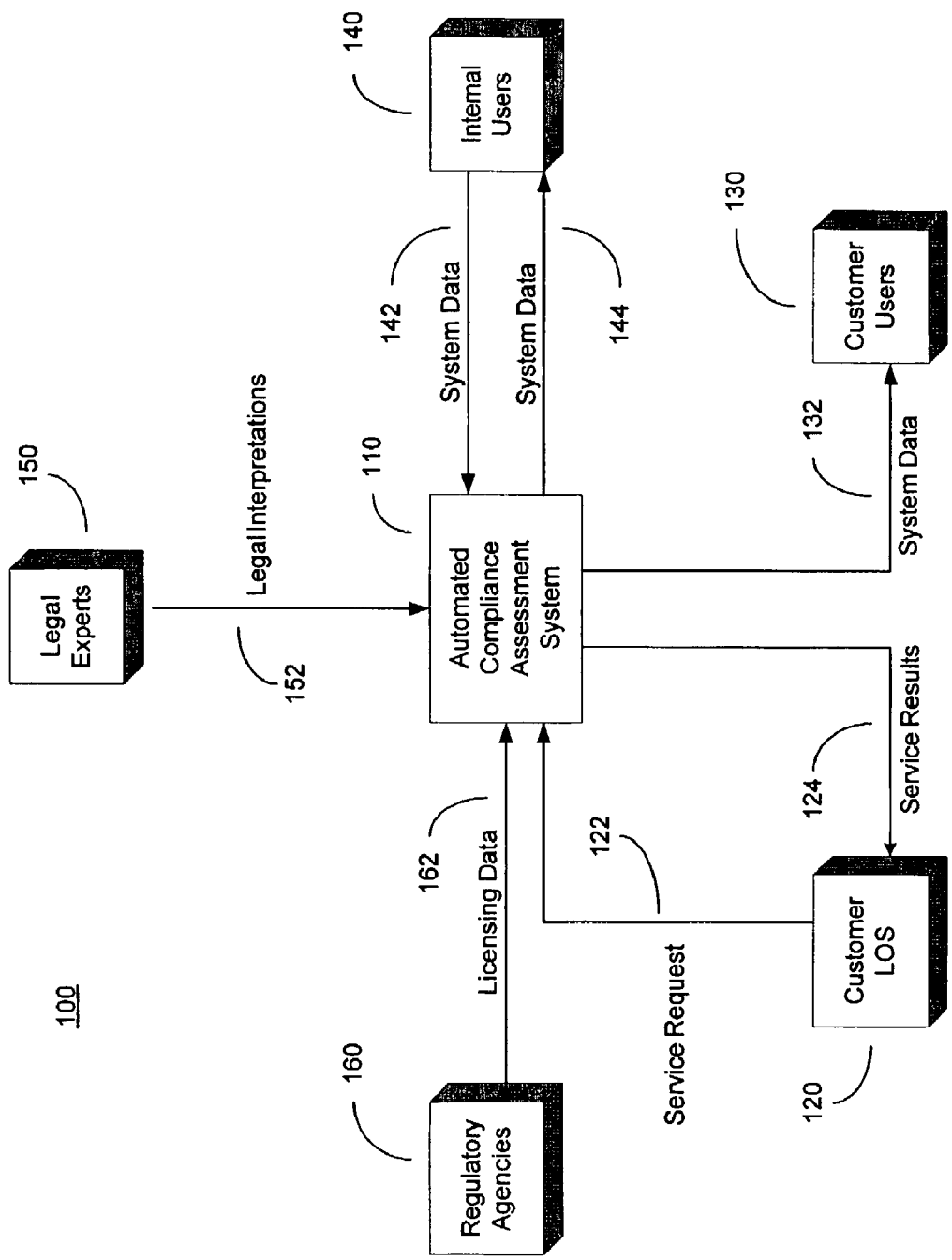
FIG. 1 shows an automated loan compliance assessment system environment diagram.

Turning now to FIG. 1, FIG. 1 shows an automated loan compliance assessment system environment diagram 100, including an automated compliance assessment system 110, customer loan origination system (LOS) 120, customers users 130, internal users 140 to the entity operating the automated compliance assessment system 110, legal experts 150, and regulatory agencies 160. The automated compliance assessment system 110 comprises an automated system that includes a process manager, an expert system and databases for reviewing real estate loans for compliance with applicable requirements. An automated compliance assessment system 110 interacts with various groups in order to assure compliance with regulatory requirements. Regulatory agencies 160 include various Federal, state and local agencies that provide licensing and licensee data 162 to the system 110. The licensing and licensee data 162 include a compilation of applicable licenses and active licensees that the system 110 requires for ensuring compliance with licensing requirements. Legal experts 150 comprise a team of attorneys and compliance specialists responsible for reviewing and analyzing applicable sources of legal compliance requirements. They prepare legal interpretations 152 for entry into the system 110 in terms of plain English rules that reflect compliance requirements. These legal experts 150 may be internal and external to the entity operating the automated compliance assessment system 110. Internal users 140 are personnel within the entity operating the automated compliance assessment system 110 that have access to input system data 144 and to output system data 142 to the system 110 for viewing and modifying results data, setup data, rules data, supplemental data and license data. Customer users 130 are customer personnel that have limited access to the automated compliance assessment system data 132 for viewing results, rules and license data. A customer loan origination system (LOS) 120 resides on a secure communication network connection to the automated compliance assessment system 110 and includes a database where loan data is stored, accessed and maintained. The customer LOS 120 may initiate a manual or an automatic request 122 to the automated compliance assessment system 110 via the secure communication network connection to extract loan data from the customer LOS 120 and perform a compliance assessment review. A loan compliance assessment performed by the automated compliance assessment system 110 may be triggered by a change in status or at milestones in the workflow of a loan application in the LOS 120. An assessment may also be triggered by manual intervention by s system user. For example, underwriting, document preparation, a closing, etc may trigger a compliance assessment of a loan application file. The automated compliance assessment system 110 responds to the service request 122 from the customer LOS 120 by transmitting a service result message 124 that contains results of the compliance review performed by the system 110.

Figure 2:
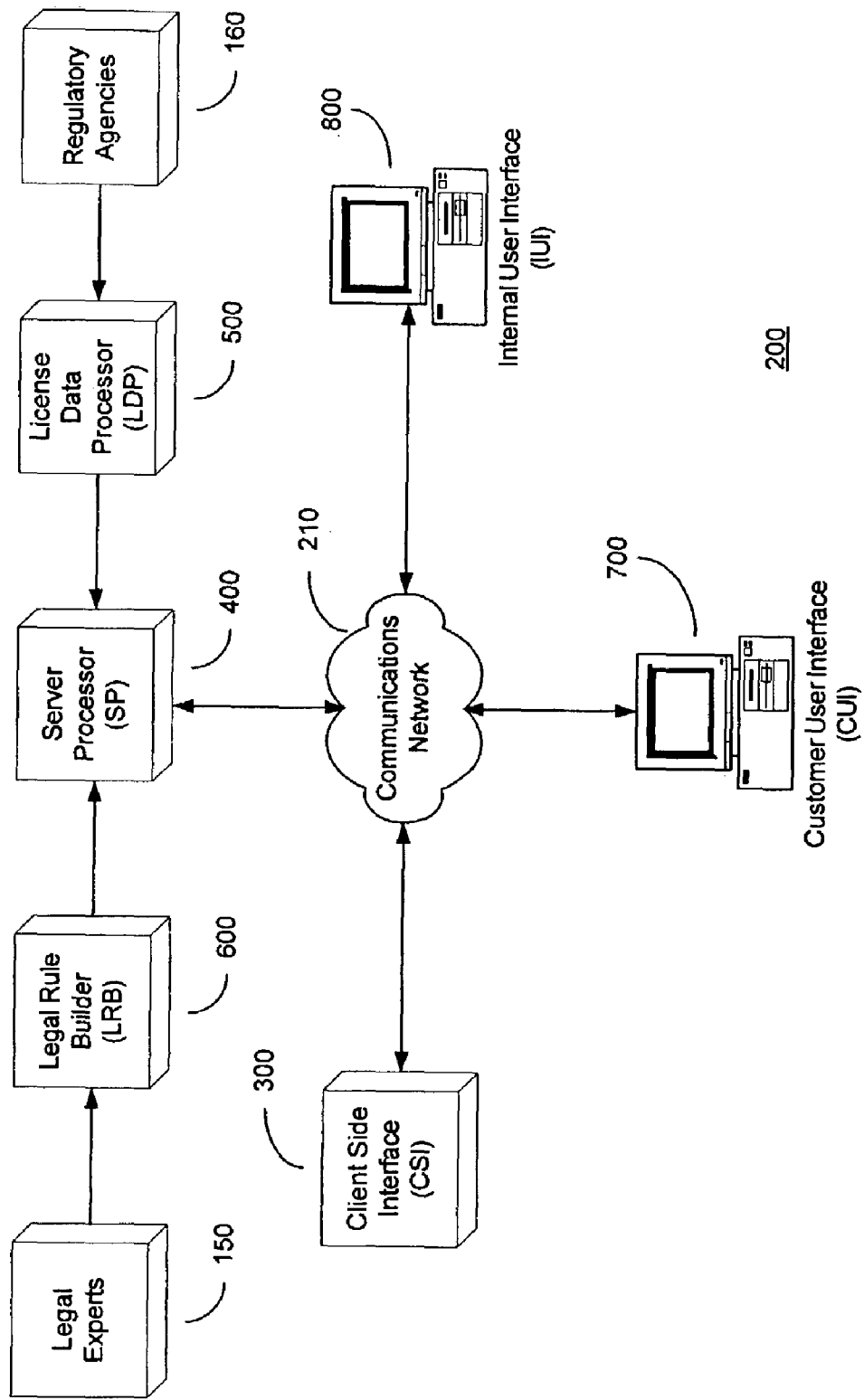
FIG. 2 shows an automated loan compliance assessment system interconnection diagram.

Turning to FIG. 2, FIG. 2 shows an automated loan compliance assessment system interconnection diagram 200. A server processor 400 is connected to a secure communication network 210 for communication with a client side interface (CSI) 300, a customer user interface 700 and an internal user interface 800. The client side interface (CSI) 300 also includes the client LOS. Legal experts 150 provide plain English rules to a legal rule builder (LRB) 600, which converts these plain English rules to an XML rules file for use by the server processor 400. Regulatory agencies 160 provide licensing requirements and license compilations to a license data processor 500, which provides this license data to the server processor 400 in the form of an XML file.

Figure 3:
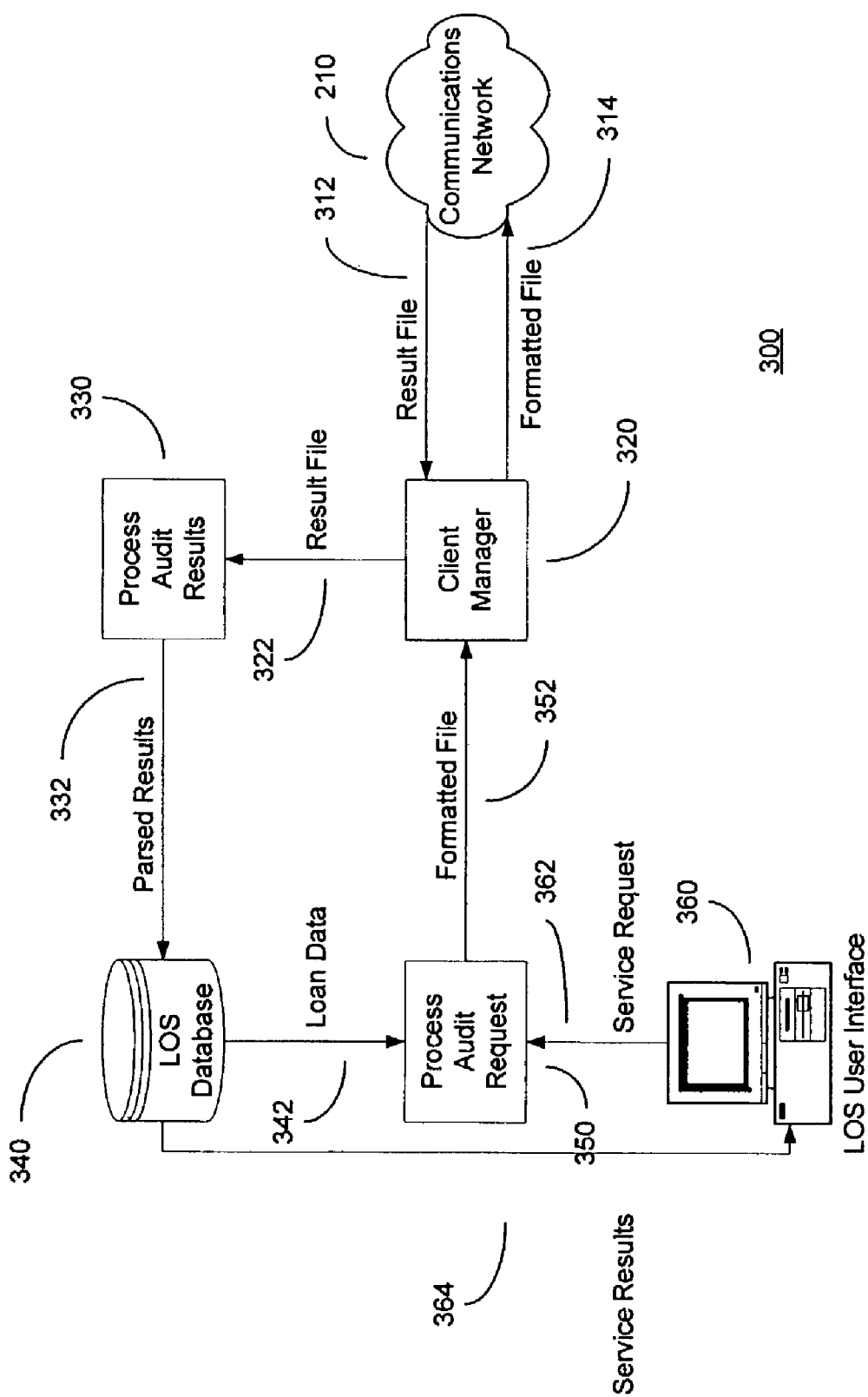
FIG. 3 shows a client side interface (CSI) diagram.

Turning to FIG. 3, FIG. 3 shows a client side interface (CSI) diagram 300, which enables a client LOS to communicate with a server processor via a secure communication network 210. The CSI 300 runs at a customer location and uses a secure communication network 210, which may be the Internet, a telephone communication network, a satellite communication network, a cable network, a microwave communication network, a radio communication network, a wireless telephone communication network, etc., to communicate with a server processor. The CSI 300 extracts data from the customer's LOS system and formats it as an XML document, which is then encrypted, compressed and transmitted to a server processor via the secure communication network 210. A manual service request 362 may be initiated by a user via the LOS user interface 360 or may be automatically generated by the CSI 300. This request starts the process audit request 350, which extracts loan data 342 from a LOS database 340, converts the loan data 342 to an XML file and sends a formatted file 352 to a client manager 320. The loan data 342 extracted from the LOS database 340 contains unique loan information about a particular piece of collateral, lien position and loan program that is stored and maintained in the LOS database. When the client manager 320, which is a messaging component that resides in the CSI 300 to track outbound formatted files 314 and inbound result files 312, receives the formatted file 352 from the process audit request 350, it transmits the formatted loan file 314 to a server processor via the secure communication network 210. An embodiment of a formatted loan file 314 is depicted in FIG. 5. As a result of this audit request, the client manager 320 receives a result file 312 from the server processor, which it sends as a result file 322 to a process audit results function 330. The result file 322 is a loan data file that has been reviewed by the server processor, and has those results appended to the file. An embodiment of a result file 312 is depicted in FIG. 6. The process audit results function 330 extracts, parses and transmits the parsed results 332 portion of the result file 322 to the LOS database 340. When the LOS database 340 receives the parsed results 332 of a compliance review request, the parsed results are stored in the LOS database 340 and the service results 364 are forwarded to the LOS user interface 360 for display.

Figure 4:
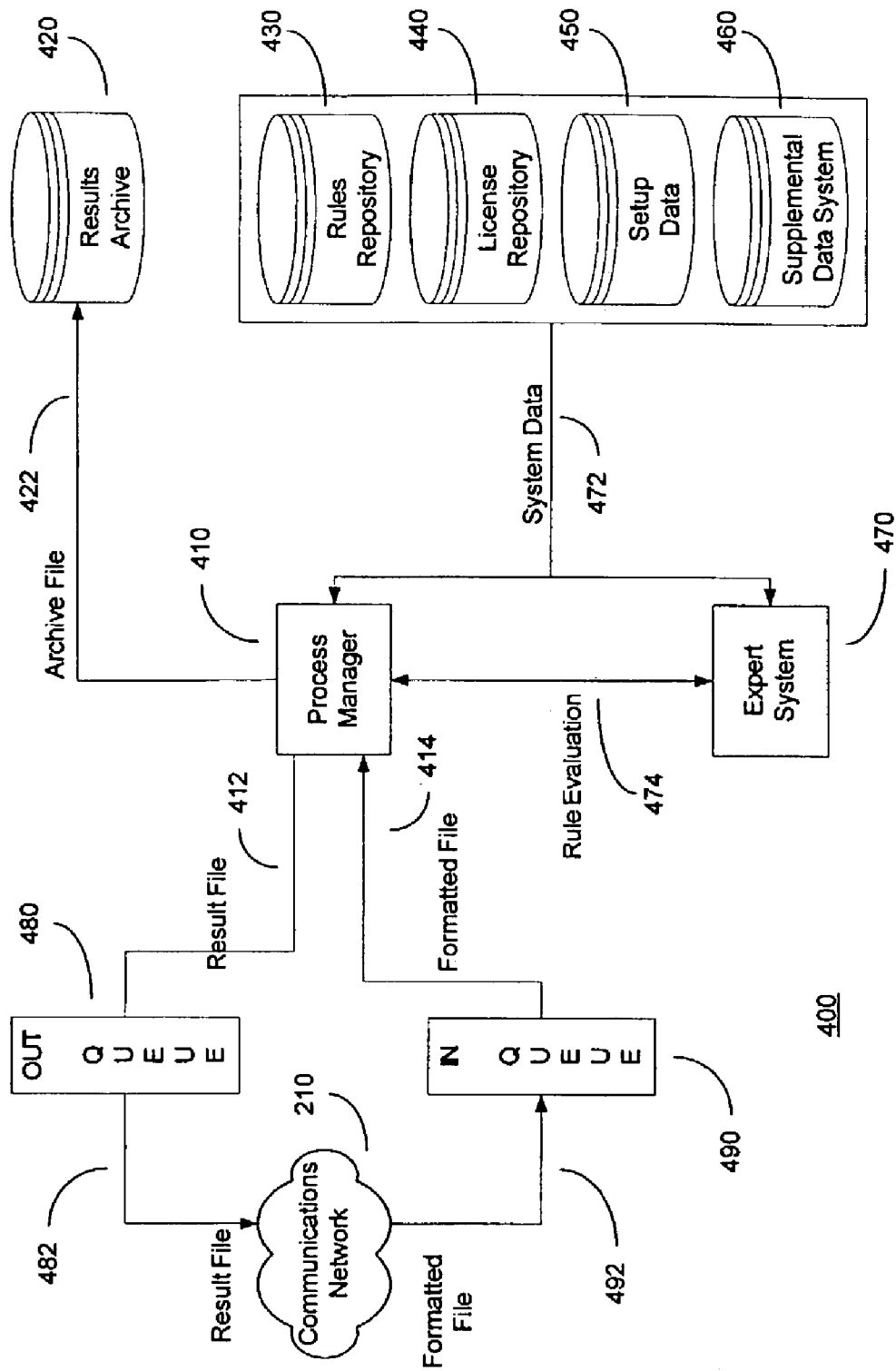
FIG. 4 shows a server processor (SP) diagram.

Turning to FIG. 4, FIG. 4 shows a server processor (SP) diagram 400. The SP 400 receives requests from a CSI and authorizes transactions based on a security profile. Once authorized, the SP 400 queues the transaction for an audit engine, which perform a compliance review of the loan data. When a SP 400 receives a formatted loan file 492 from a CSI via a secure communications network 210, the formatted loan file 492 is placed in an input queue 490 to be held until a process manager 410 is able to submit the formatted loan file 414 to an expert system 470. An embodiment of a formatted loan file 492 is depicted in FIG. 5. The process manager 410 verifies the formatted file schema, customer passwords, and validates the compliance review request. The process manager 410 submits the formatted loan request to the expert system 470 where a rules evaluation 474 is conducted by which files are reviewed in accordance with applicable rules and regulations. The expert system 470 is an engine of the automated compliance assessment system that uses system data 472 to evaluate compliance and append its response to the formatted file 414 to create a result file 412. The system data 472 comprises results data 422 stored for future reference in a results archive repository 420, rules data containing all system rules and supporting documentation including English rules and legal interpretation references stored in a rules repository 430, license data stored in a license repository 440, setup data including various industry tables and databases that support the compliance review process stored in a setup data repository 450 and supplemental data containing various customer specific tables and databases that support the compliance review process stored in a supplemental data system (SDS) repository 460. The result file 412 is sent from the process manager 410 to an output queue 480, where outgoing result files 482 are held until a client manager in a CSI is able to process the result file 482. An embodiment of a result file 482 is depicted in FIG. 6. It should be noted that if a compliance assessment does not find any warnings or negative results of the assessment, no notification is provided to the user.

Turning to FIG. 5, FIG. 5 shows an embodiment of a formatted loan file sent from the CSI to the SP for requesting a compliance assessment. The formatted loan file of FIG. 5 comprises several major segments of mortgage data, including loan details, fees, impound fees, borrower information, prepayment penalties, late fees, proposed housing information, mortgage insurance information, lender license information, home mortgage disclosure act (HMDA) information and miscellaneous fees. Loan details are descriptive information concerning the loan, including amortization term, annual percentage rate, loan term, property type, sale price, annual taxes, annual income of applicant, etc. Fees include settlement/closing fees, title insurance fees, title insurance binder fees, recording fees, origination fees, appraisal/final inspection broker fees, broker fees, and processing and administrative broker fees. Impound fees include escrowed hazard insurance and escrowed county taxes. Miscellaneous fees include flood certification fees and tax service contract fees.

Turning to FIG. 6, FIG. 6 shows an embodiment of a result file sent from the SP to the CSI containing results of a compliance assessment. As shown in FIG. 6, the first section of the result file contains the formatted loan file that was received by the SP from the CSI to initiate a compliance assessment. The compliance assessment result shown in FIG. 6 is the service response that includes assessment provider data, customer (lender) data, numerous audit groups, geographic code data, high cost data and applicable licenses. The numerous audit groups include validation of broker license data, validation of customer license data, validation of fee data, validation of impound data, fee audit, high cost audit for federal, state and city requirements, broker license audit, lender license audit, state rules audit, home mortgage disclosure act (HMDA) requirements audit for geolocator, county and census tract, loan fees audit and review, and custom business rules.

Figure 7:
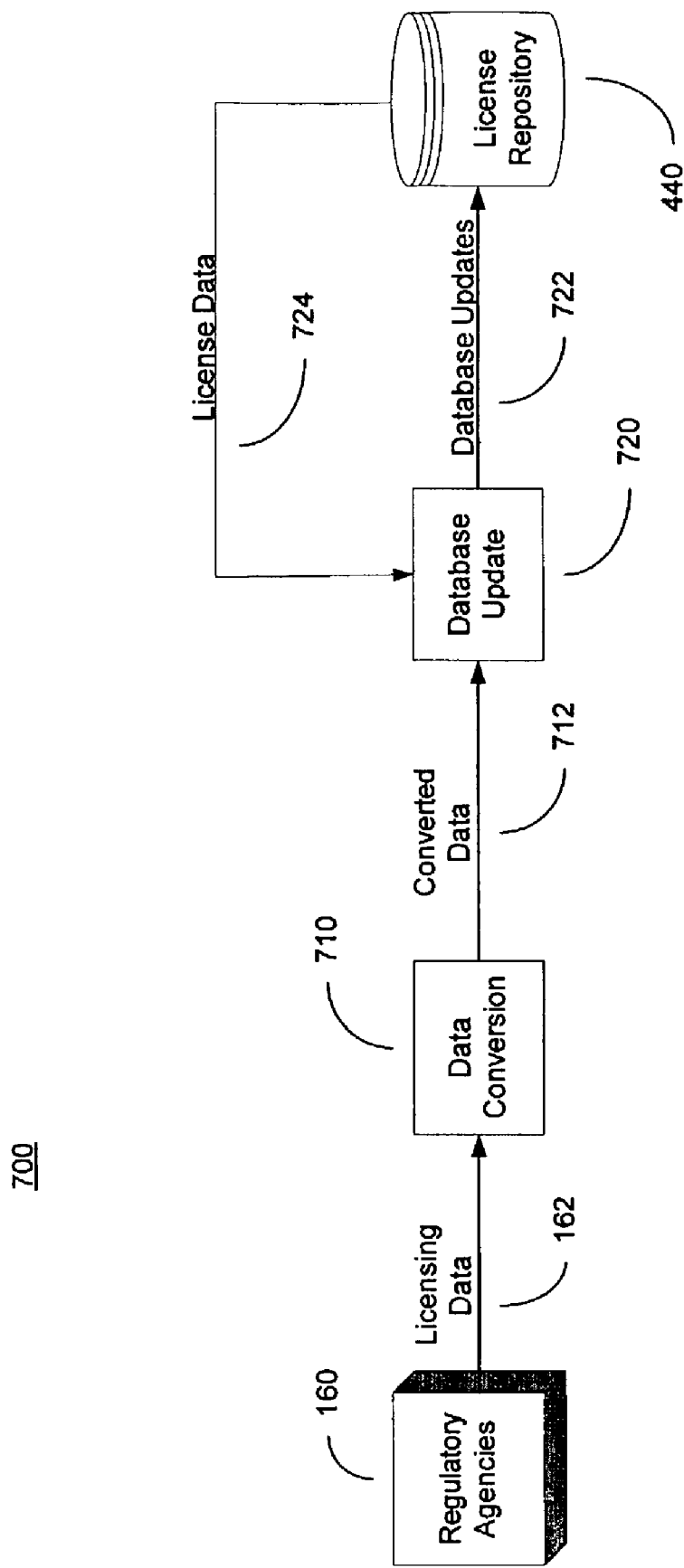
FIG. 7 shows a license data processor (LDP) diagram.

Turning to FIG. 7, FIG. 7 shows a license data processor (LDP) diagram 700. The LDP 700 ensures that the licensing data used by the compliance assessment system has the most current information for compliance review. Licensing data 162 comprising compilations of applicable licenses and active licensees is extracted from regulatory agencies 160 such as Federal, state and local agencies. A data conversion processor 710 converts the licensing data 162 into a formatted XML converted data file 712, and send it to a database update processor 720 where database updates 722 are uploaded to a license repository 440. The database update processor 720 may also access the license repository 440 for license data 724 that may include historical records of licensing data stored in the license repository 440.

Figure 8:
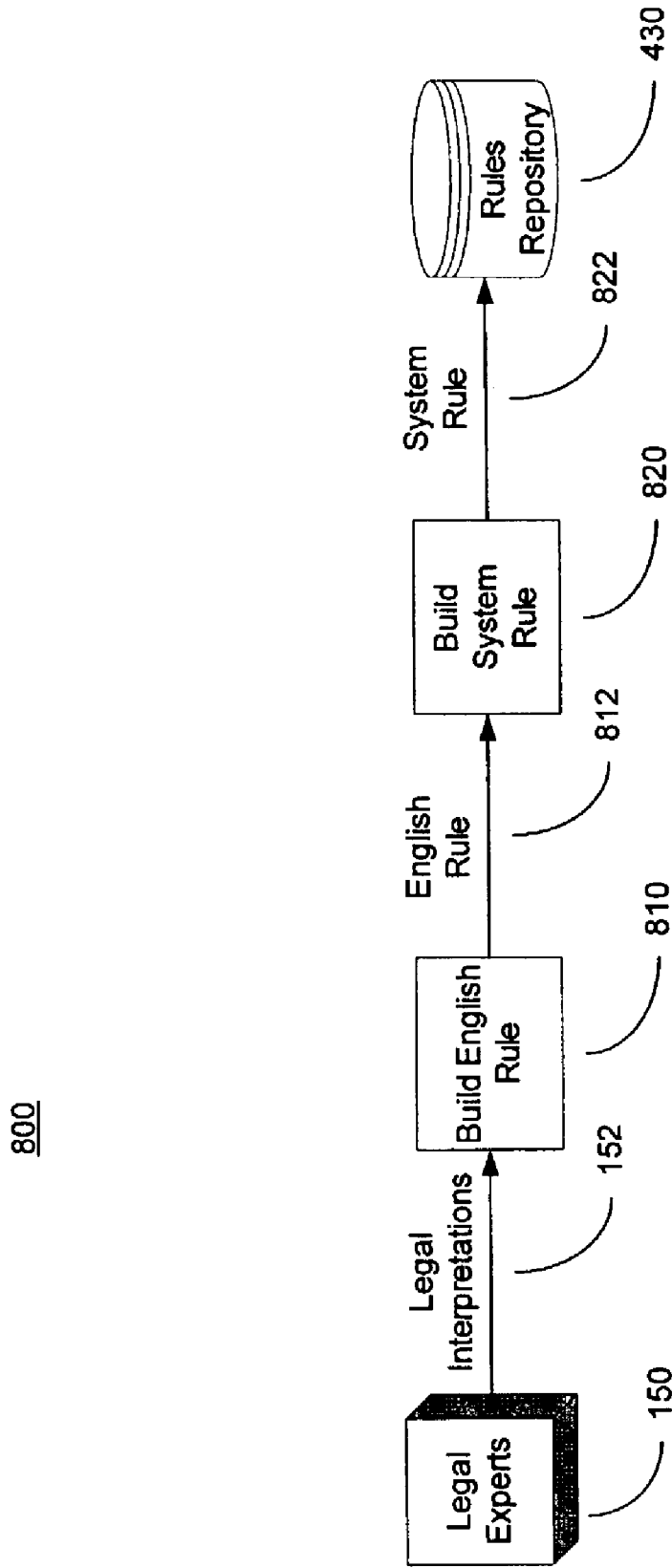
FIG. 8 shows a legal rule builder (LRB) diagram.

Turning to FIG. 8, FIG. 8 shows a legal rule builder (LRB) diagram 800. The LRB 800 is used to build rules based on statutes, regulations, ordinances, administrative codes and guides, official interpretations, court decisions, and other sources of legal compliance requirements, which may be used to perform compliance reviews. Legal experts 150 are teams of attorneys and compliance specialists who are responsible for reviewing and analyzing statutes, regulations and court decisions for providing legal interpretation 152 of these references. These legal interpretations 152 are then synthesized and distilled by the build English rule processor 810 into terms of plain English rules 812 that reflect compliance requirements. A build system rule processor 820 converts the plain English rules 812 into system rules 822, which are computer syntax versions of the plain English rules 812. The system rules 822 are stored in a rules repository 430.

Figure 9:
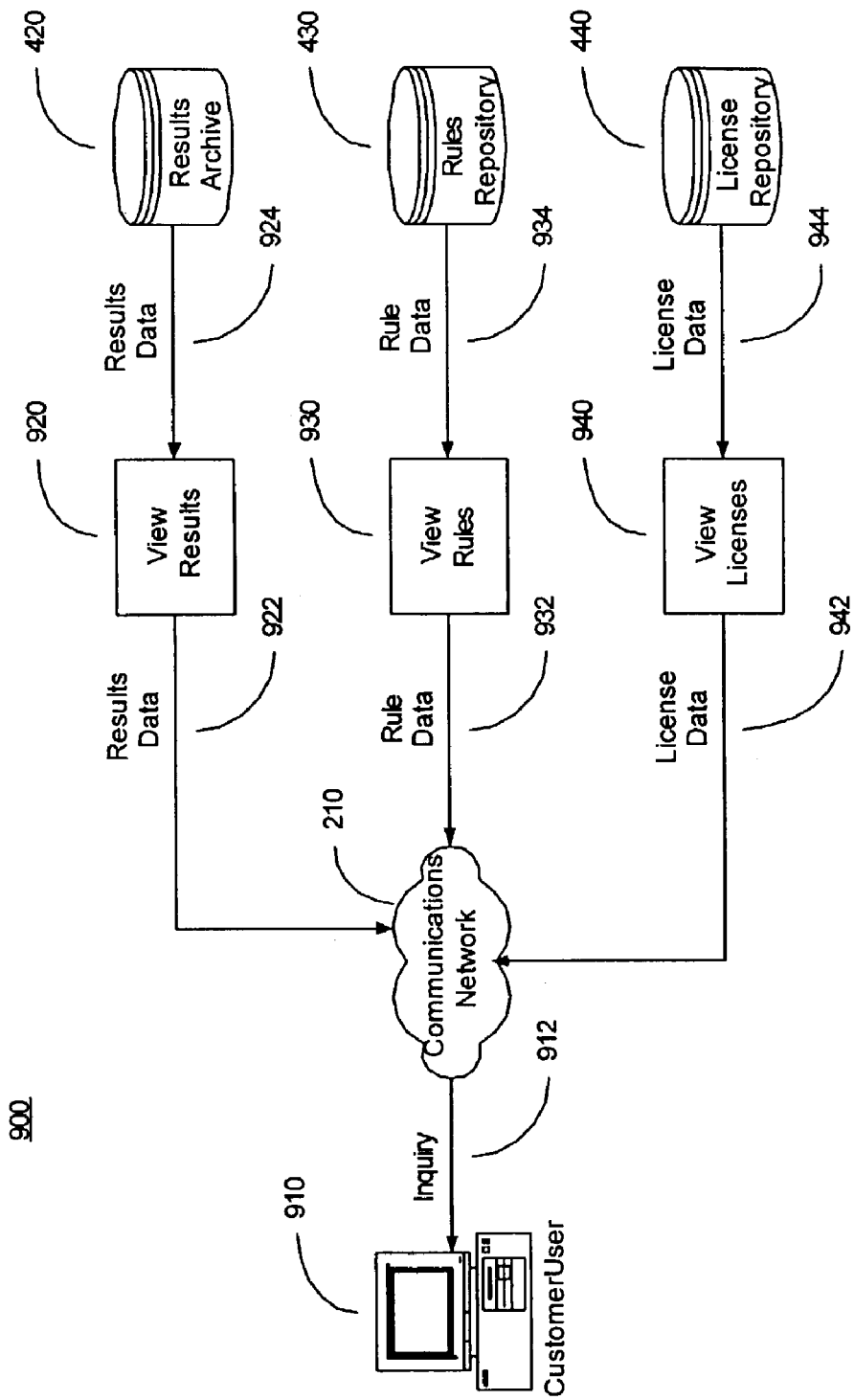
FIG. 9 shows a customer user interface (CUI) diagram.

Turning to FIG. 9, FIG. 9 shows a customer user interface (CUI) diagram 900. A customer user 910 is user personnel that have limited access to the compliance assessment system, and may use the CUI 900 to view results, rules and license data. The customer user 910 may send an inquiry 912 via a secure communications network 210 to a server processor. When the server processor receives a results data inquiry 912 from a customer user 910 to view results data containing individual compliance reviews results for a particular loan, a view results processor 920 accesses the requested results data 924 from the results archive repository 420 and sends the result data 922 to the customer user 910 via the secure communication network 210. When the server processor receives a rules inquiry 912 from a customer user 910 to view rules data containing individual system rule information and all supporting documentation, including English rules and related references to the legal interpretations, a view rules processor 930 accesses the requested rules data 934 from the rules repository 430 and sends the rules data 932 to the customer user 910 via the secure communication network 210. When the server processor receives a license inquiry 912 from a customer user 910 to view license data containing the results of an individual licensee look-up request, a view license processor 940 accesses the requested license data 944 from the license repository 440 and sends the license data 942 to the customer user 910 via the secure communication network 210.

Figure 10:
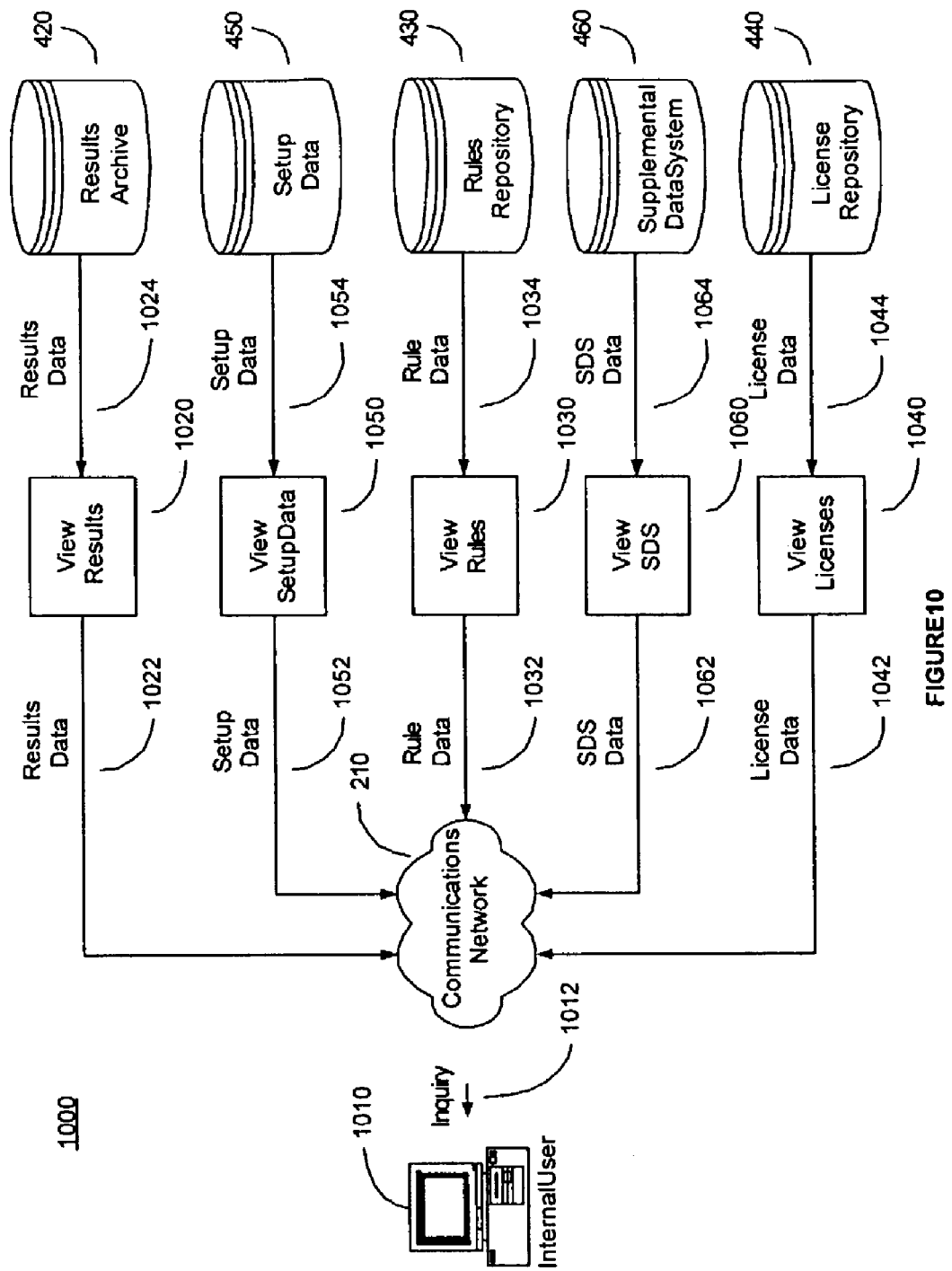
FIG. 10 shows an internal user interface (IUI) diagram.

Turning to FIG. 10, FIG. 10 shows an internal user interface (IUI) diagram 1000. Internal users are personnel employed by the entity that operates the loan compliance assessment system, and who may access to view results data, setup data, rules data, SDS data and license data. An internal user 1010 may send an inquiry 1012 via a secure communications network 210 to a server processor. When the server processor receives a results data inquiry 1012 from an internal user 1010 to view results data containing individual compliance reviews results for a particular loan, a view results processor 1020 accesses the requested results data 1024 from the results archive repository 420 and sends the result data 1022 to the internal user 1010 via the secure communication network 210. When the server processor receives a rules inquiry 1012 from an internal user 1010 to view rules data containing individual system rule information and all supporting documentation, including English rules and related references to the legal interpretations, a view rules processor 1030 accesses the requested rules data 1034 from the rules repository 430 and sends the rules data 1032 to the customer user 1010 via the secure communication network 210. When the server processor receives a license inquiry 1012 from a customer user 1010 to view license data containing the results of an individual licensee look-up request, a view license processor 1040 accesses the requested license data 1044 from the license repository 440 and sends the license data 1042 to the customer user 1010 via the secure communication network 210. When the server processor receives an inquiry 1012 from a customer user 1010 to view setup data containing various industry tables and databases that support the compliance review process, a view setup data processor 1050 accesses the requested setup data 1054 from the setup data repository 450 and sends the setup data 1052 to the customer user 1010 via the secure communication network 210. When the server processor receives an SDS data inquiry 1012 from a customer user 1010 to view SDS data containing various customer specific tables and databases that support the compliance review process, a view SDS data processor 1060 accesses the requested SDS data 1064 from the SDS repository 460 and sends the SDS data 1062 to the customer user 1010 via the secure communication network 210. The SDS repository 460 may contain data to augment data that may be missing from a result file.

Figure 11:
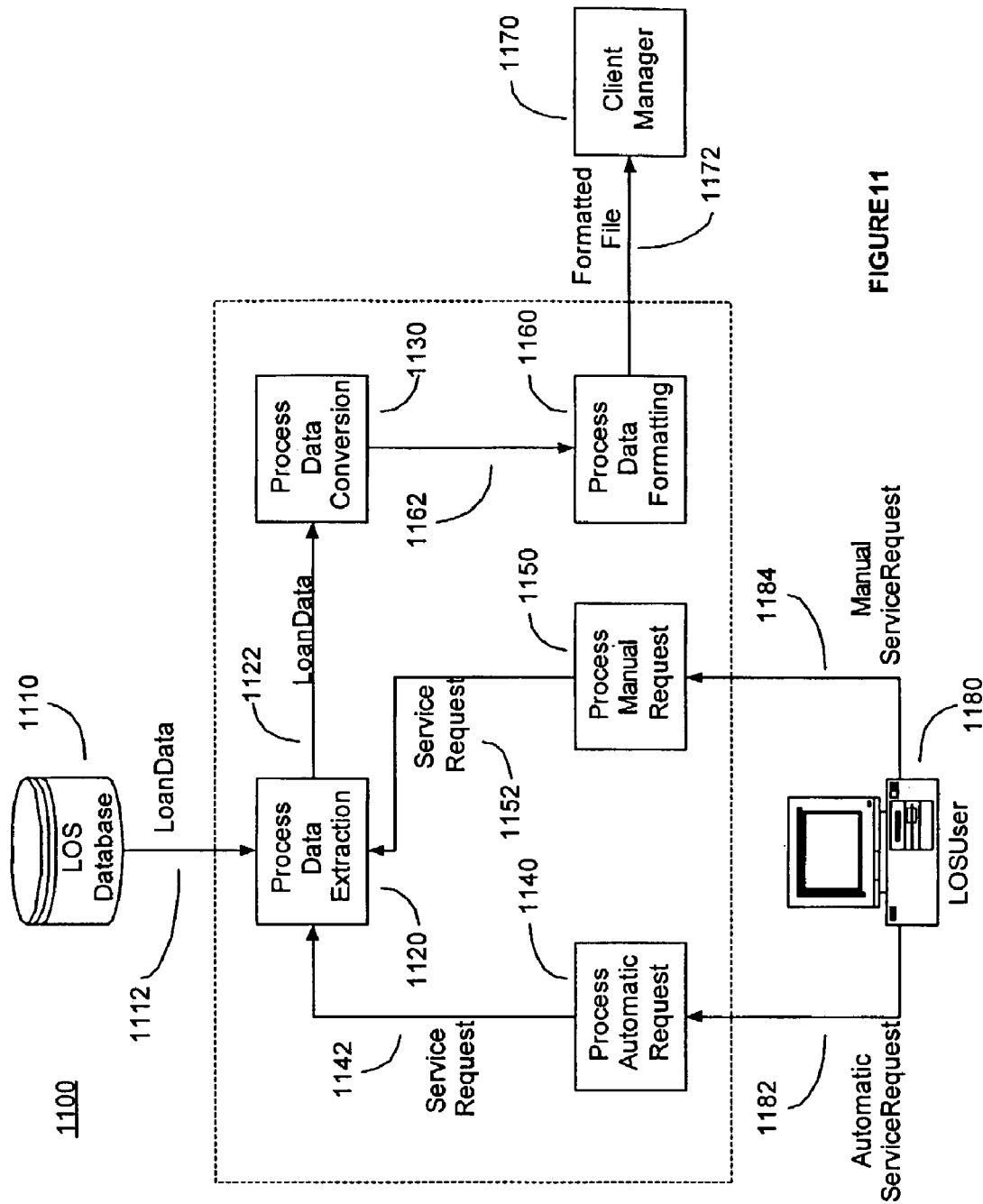
FIG. 11 shows a process audit request (PAR) diagram.

Turning to FIG. 11, FIG. 11 shows a process audit request (PAR) diagram 1100. A LOS user 1180, customer personnel that access mortgage loan data through the customer LOS, may initiate a manual service request 1184 or an automatic service request 1182. The LOS user 1180 may initiate a manual service request 1184, while an automatic service request 1182 is initiated upon the occurrence of designated conditions during the life cycle of the loan. Automatic triggers to initiate compliance assessment include a change in status or a milestone in the loan workflow has been achieved, such as underwriting, document preparation or loan closing. An automatic service request 1182 causes the process automatic request function 1140 to initiate a service request 1142 to the process data extraction function 1120 for performing a process audit. A manual service request 1184 causes the process manual request function 1150 to also initiate a service request 1152 to the process data extraction function 1120 for performing a process audit. When the process data extraction function 1120 receives a service request 1142, 1152, it extracts designated loan data 1112 from the LOS database 1110 and sends the loan data 1122 to the process data conversion function 1130. A process data conversion function 1130 converts the loan data 1122 from the LOS database into data 1162 that is compatible with the automated loan compliance assessment system. A process data formatting function 1160 receives the system loan codes 1162 from the process data conversion function 1130, formats the system loan codes 1162 into an XML file 1172, and sends the formatted XML file 1172 to a client manager 1170. The client manager 1170 sends the formatted XML file, as shown in FIG. 5, to the automated loan compliance assessment system via a secure communication network, as shown in FIG. 3. It should be noted that if a compliance assessment does not find any warnings or negative results of the assessment, no notification is provided to the user.

Figure 12:
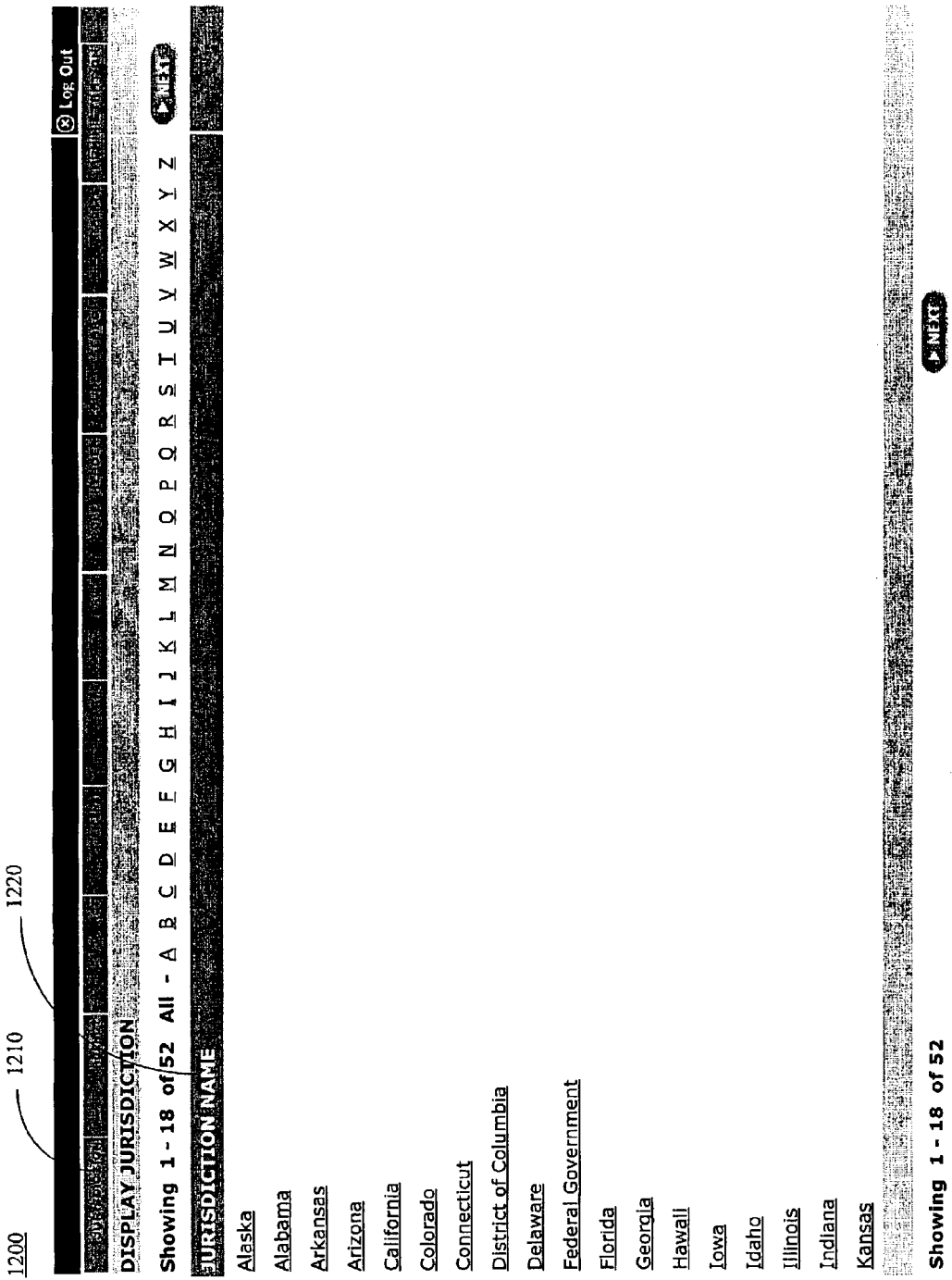
FIG. 12 depicts a screen shot showing a list of jurisdictions where the system is capable of assessing mortgage loan compliance.

Turning to FIG. 12, FIG. 12 depicts a screen shot showing a partial list of jurisdictions where the system is capable of assessing mortgage loan compliance 1200. A user accesses this display 1200 by positioning a cursor over the JURISDICTION toolbar title button 1210, which causes a drop-down menu to appear beneath the toolbar title button that contains a selection DISPLAY JURISDICTION. By clicking on this selection, the screen shot shown in FIG. 12 may be displayed that provides the capability of listing all jurisdictions under the column JURISDICTION NAME 1220. Each jurisdiction under the JURISDICTION column 1220 may be hyperlinked to additional information and requirements concerning the selected jurisdiction.

Turning to FIG. 13, FIG. 13 depicts a screen shot showing a list of agencies in each jurisdiction that promulgates regulations with which mortgage loan processes and associated licensed personnel must comply 1300. A user accesses this display 1300 by positioning a cursor over the AGENCY toolbar title button 1310, which causes a drop-down menu to appear beneath the toolbar title button that contains a selection DISPLAY AGENCY. By clicking on this selection, the screen shot shown in FIG. 13 may be displayed that provides the capability of listing all jurisdictions under a JURISDICTION column 1320 and agencies under an AGENCY column 1330. Each agency listing under the AGENCY column 1330 may be hyperlinked to additional information and requirements concerning the selected agency.

Turning to FIG. 14, FIG. 14 depicts a screen shot showing a list of acts in each jurisdiction that contain compliance requirements with which mortgage loan processes and associated licensed personnel must comply 1400. A user accesses this display 1400 by positioning a cursor over the ACT toolbar title button 1410, which causes a drop-down menu to appear beneath the toolbar title button that contains a selection DISPLAY ACT. By clicking on this selection, the screen shot shown in FIG. 14 may be displayed that provides the capability of listing all jurisdictions under a JURISDICTION column 1420 and associated acts under an ACT NAME column 1430. Each act listed under the ACT NAME column 1430 may be hyperlinked to additional information concerning the requirements of the selected act.

Turning to FIG. 15, FIG. 15 depicts a screen shot showing a list of license requirements in each jurisdiction for personnel and entities that process mortgage loan applications 1500. A user accesses this display 1500 by positioning a cursor over the LICENSE toolbar title button 1510, which causes a drop-down menu to appear beneath the toolbar title button that contains a selection DISPLAY LICENSE. By clicking on this selection, the screen shot shown in FIG. 15 may be displayed that provides the capability of listing all jurisdictions under a JURISDICTION column 1520 and required licenses under a LICENSE column 1530. Each license listed under the LICENSE column 1530 may be hyperlinked to additional information concerning the requirements of the selected license.

Figure 16:
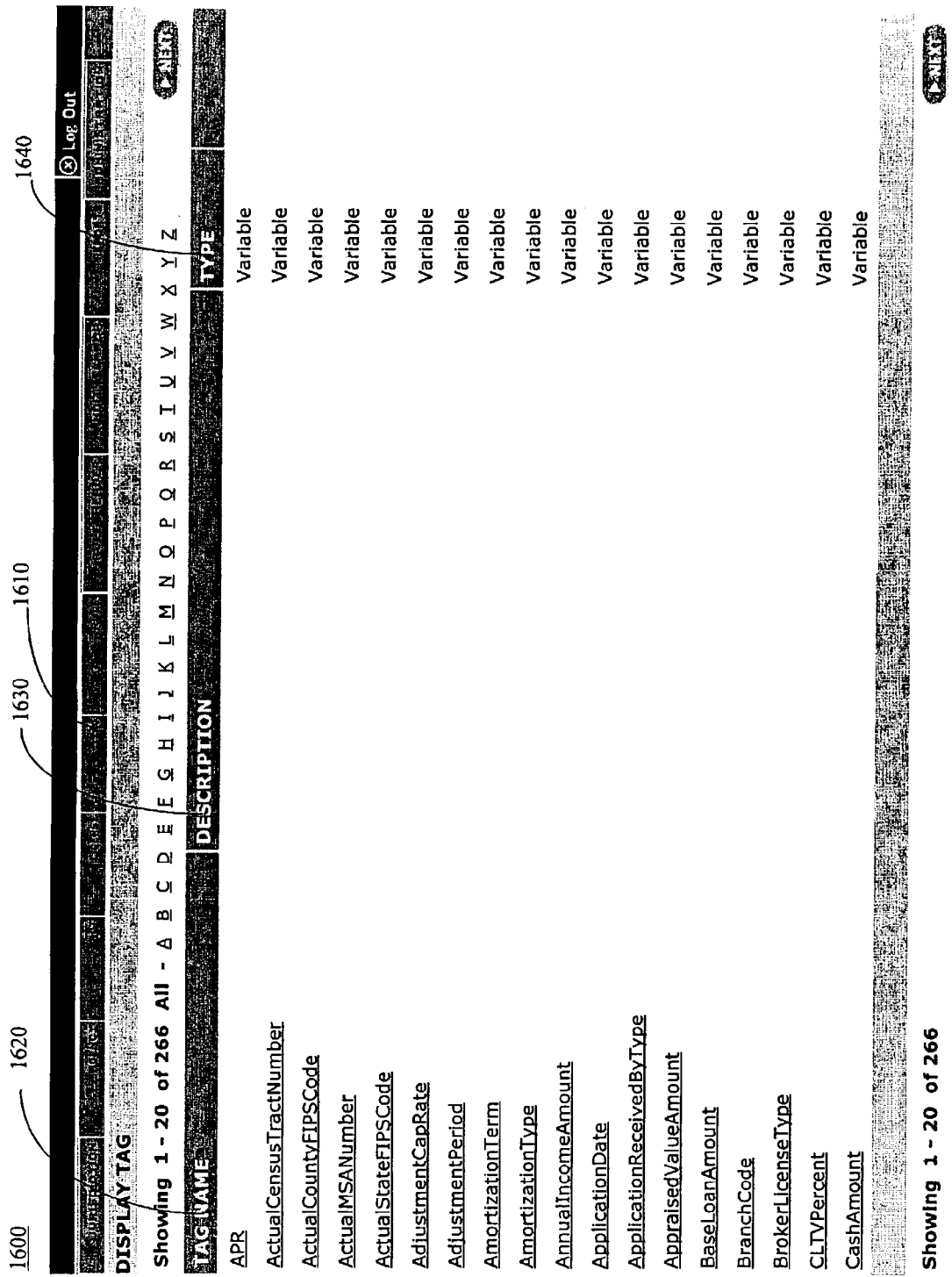
FIG. 16 depicts a screen shot showing a list of tag names for identifying data.

Turning to FIG. 16, FIG. 16 depicts a screen shot showing a list of tag names for identifying data that may be required in order to process mortgage loan applications 1600. A user accesses this display 1600 by positioning a cursor over the TAG toolbar title button 1610, which causes a drop-down menu to appear beneath the toolbar title button that contains a selection DISPLAY TAG. By clicking on this selection, the screen shot shown in FIG. 16 may be displayed that provides the capability of listing all tag names under a TAG NAME column 1620, associated descriptions under a DESCRIPTION column 1630 and data type under a TYPE column 1640. Each tag name listed under the TAG NAME column 1620 may be hyperlinked to additional information concerning the selected tag name.

Figure 17:
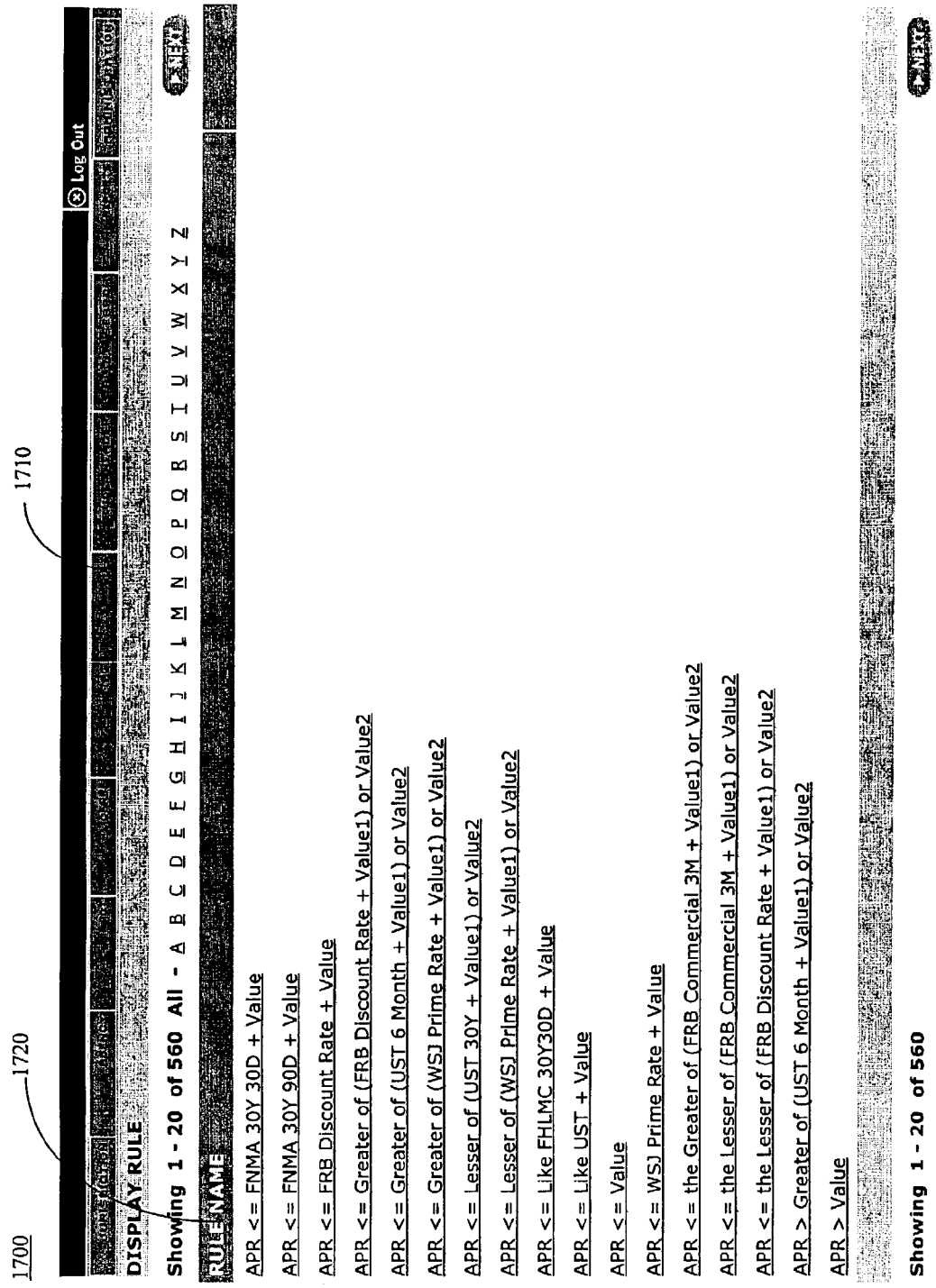
FIG. 17 depicts a screen shot showing a list of rule names for identifying rules.

Turning to FIG. 17, FIG. 17 depicts a screen shot showing a list of rule names for identifying rules that may be required in order to process mortgage loan applications 1700. A user accesses this display 1700 by positioning a cursor over the RULE toolbar title button 1710, which causes a drop-down menu to appear beneath the toolbar title button that contains a selection DISPLAY RULE. By clicking on this selection, the screen shot shown in FIG. 17 may be displayed that provides the capability of listing all rule names under a RULE NAME column 1720. Each rule name listed under the RULE NAME column 1720 may be hyperlinked to additional information concerning the selected rule name.

Figure 18:
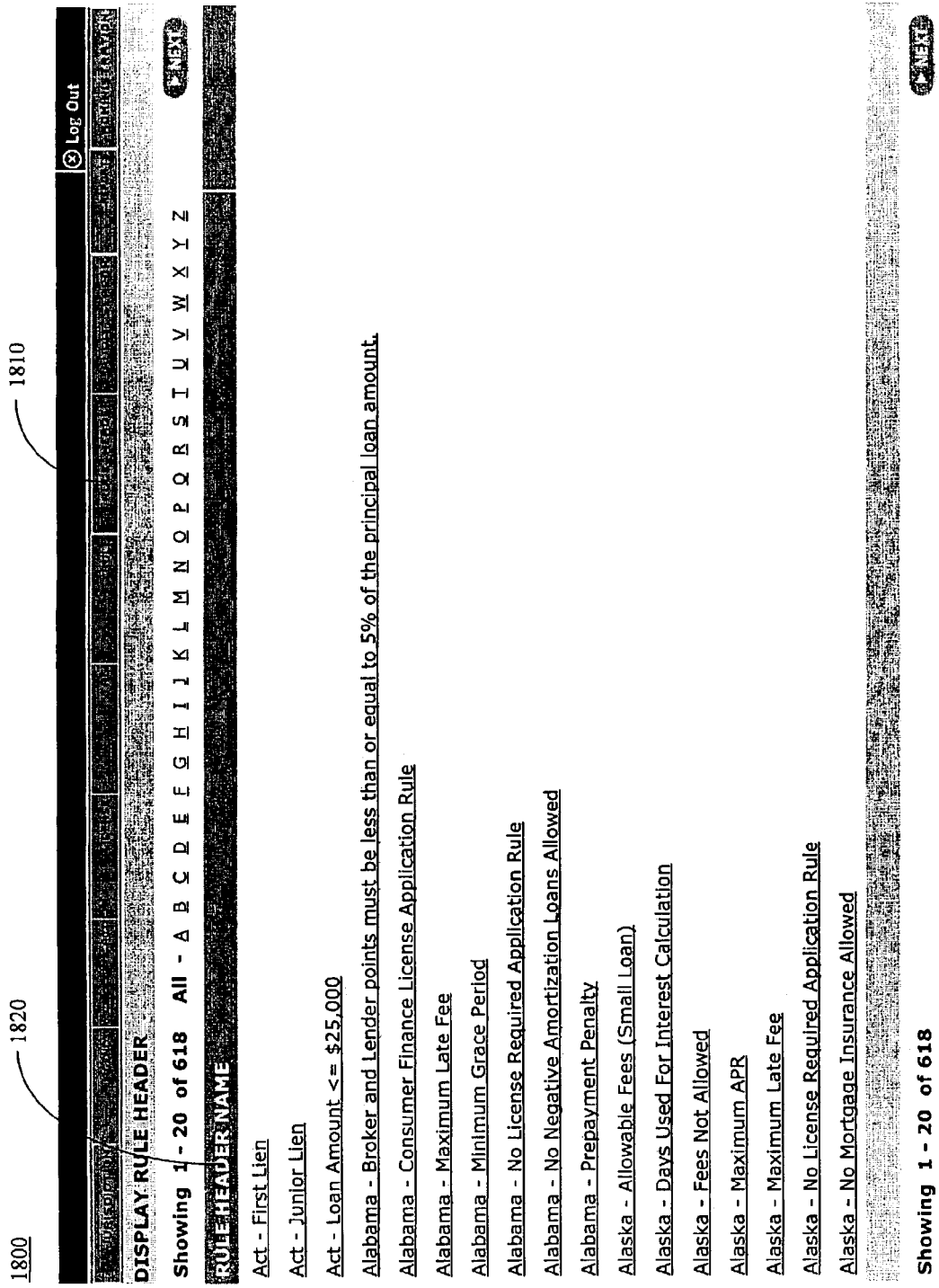
FIG. 18 depicts a screen shot showing a list of rule header names.

Turning to FIG. 18, FIG. 18 depicts a screen shot showing a list of rule header names for identifying rule headers that may be required in order to process mortgage loan applications 1800. A user accesses this display 1800 by positioning a cursor over the RULE HEADER toolbar title button 1810, which causes a drop-down menu to appear beneath the toolbar title button that contains a selection DISPLAY RULE HEADER. By clicking on this selection, the screen shot shown in FIG. 18 may be displayed that provides the capability of listing all rule header names under a RULE HEADER NAME column 1820. Each rule header name listed under the RULE HEADER NAME column 1820 may be hyperlinked to additional information concerning the selected rule header name.

Turning to FIG. 19A, FIG. 19A depicts a screen shot showing a data entry screen for searching for an existing audit by loan number 1900. A user accesses this display 1900 by positioning a cursor over the AUDIT SEARCH toolbar title button 1910, which causes a drop-down menu to appear beneath the toolbar title button that contains a selection SEARCH BY LOAN NUMBER. By clicking on this selection, the screen shot shown in FIG. 19A may be displayed that provides the capability searching for an existing by loan number by entering a loan number 1920 and a customer selection 1930.

Turning to FIG. 19B, FIG. 19B depicts a screen shot showing a data entry screen for searching for an existing audit using an advanced search 1950. A user accesses this display 1950 by positioning a cursor over the AUDIT SEARCH toolbar title button 1910, which causes a drop-down menu to appear beneath the toolbar title button that contains a selection ADVANCED SEARCH. By clicking on this selection, the screen shot shown in FIG. 19B may be displayed that provides an advanced search by entering a loan number 1955, a branch selection 1960, an application date 1965, a submit date 1970, a loan status 1975, an audit status selection 1980 or a customer selection 1985.

Figure 20A:
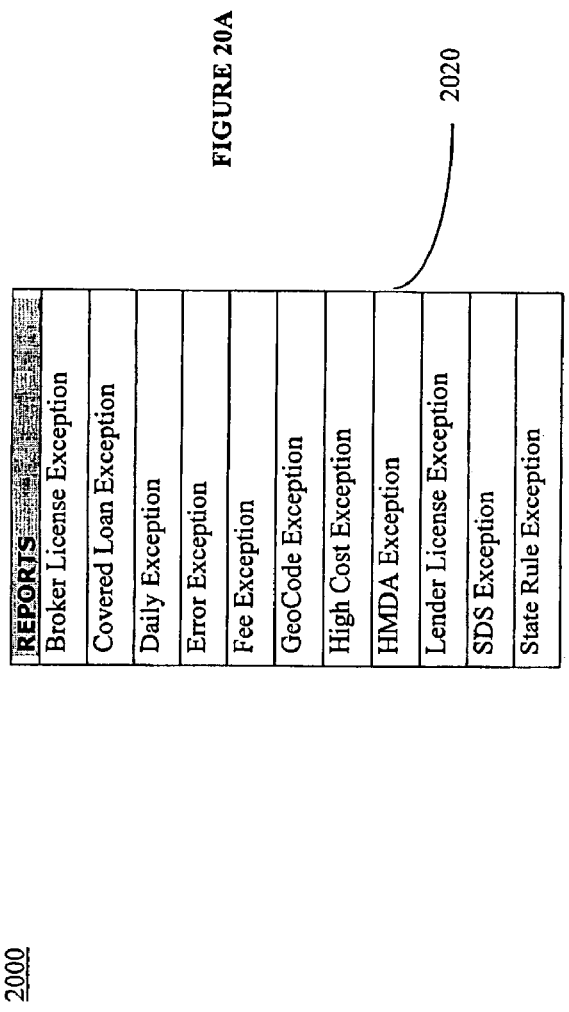
FIG. 20A depicts reports that may be selected for display.
Figure 20B:
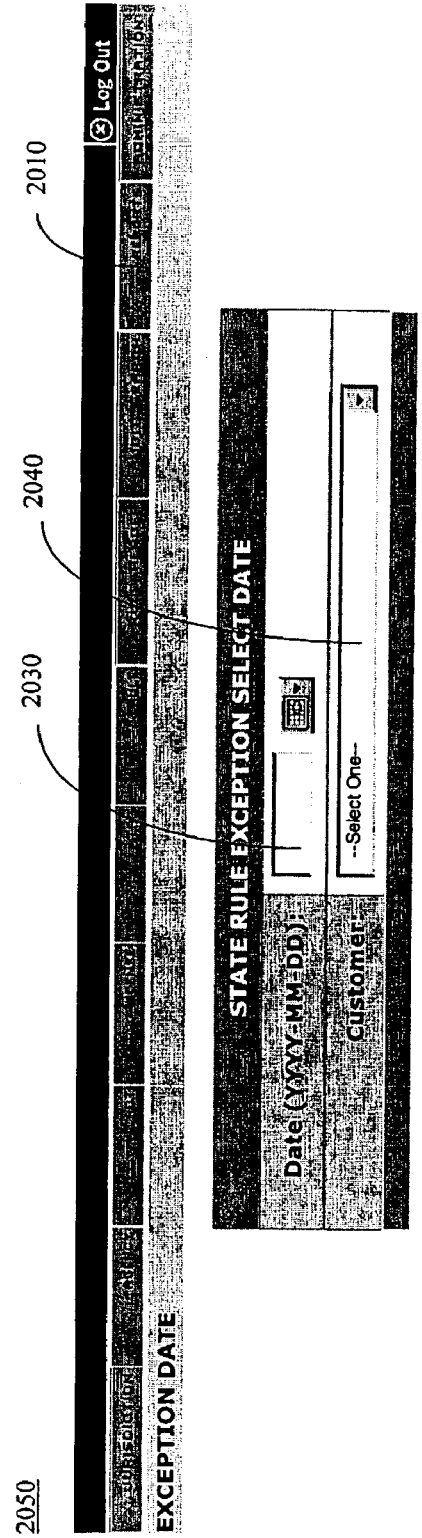
FIG. 20B illustrates a display for selecting a State Rule Exception report.

Turning to FIG. 20, FIG. 20A depicts reports that may be selected for display 2000 by positioning a cursor over the REPORTS toolbar title button 2010. These include the reports Broker License Exception, Covered Loan Exception, Daily Exception, Error Exception, Fee Exception, GeoCode Exception, High Cost Exception, HDMA Exception, Lender License Exception, SDS Exception, and State Rule Exception. FIG. 20B illustrates a display for selecting a State Rule Exception report 2050. A user accesses a report by positioning a cursor over the REPORTS toolbar title button 2010, which causes a drop-down menu to appear beneath the toolbar title button that contains the selection of reports 2000 listed in FIG. 20A. By clicking on the STATE RULE EXCEPTION selection 2020, the screen shot shown in FIG. 20B may be displayed that provides a means for selecting a State Rule Exception by entering a date 2030 and a customer selection 2040.

Turning to FIG. 21, FIG. 21 depicts a screen shot showing a list of users who are allowed access to the system 2100. A user accesses this display 2100 by positioning a cursor over the ADMINISTRATION toolbar title button 2110, which causes a dropdown menu to appear beneath the toolbar title button that contains a selection USER SETUP. By clicking on this selection, the screen shot shown in FIG. 21 may be displayed that provides information for all users of the compliance assessment system. This information includes user full name under the USER FULL NAME column 2120, user login name under the USER NAME column 2130, user company name under the COMPAMY column 2140, role of user under the USER ROLE column 2150 and user status under the STATUS column 2160.

Turning to FIG. 22, FIG. 22 depicts a screen shot showing a list of user role names 2200 that indicate the degree of access to the system by users having different roles in organizations that use the system. A user accesses this display 2200 by positioning a cursor over the ADMINISTRATION toolbar title button 2210, which causes a drop-down menu to appear beneath the toolbar title button that contains a selection ROLE SETUP. By clicking on this selection, the screen shot shown in FIG. 22 may be displayed that provides information for all user roles defined for the compliance assessment system. This information includes user role name under the NAME column 2220 and a description of the degree of access allowed under the DESCRIPTION column 2230.

There are also many additional features that are incorporated into the present invention to ensure a user-friendly environment. For example, a user is able to access system documentation via a user interface to obtain help with specific questions or issues regarding operation of the system. The system documentation function provides the following functionality:

A plain language description of system operation in the application of compliance requirements for consumer loans;

An explanation of the legal interpretation that provides the basis of system operation;

A link to specific legal compliance requirements sources; and

A reporting function that deals with the compliance functions of each rule or feature feature in the system.

Checklists may also be available to guide a user through setup procedures.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A computer-implemented method for automated loan compliance assessment, comprising the computer-implemented steps of:

extracting loan data from a client loan origination system;

converting and formatting the extracted loan data into compliance-based rule data elements for entry into computer-implemented compliance rules;

electrically assessing compliance of the formatted loan data with legal compliance requirements by a compliance assessment server for applying the formatted loan data to the computer-implemented compliance rules comprising computer instructions representing mathematical equations and logical relationships to form audit result data; and storing the audit result data designating rule compliance and rule noncompliance.

2. The method of claim 1, further comprising initiating the step of extracting by selecting from the group consisting of an automatic service request and a manual service request.

3. The method of claim 1, wherein the step of converting and formatting comprises converting and formatting the extracted loan data into a file readable by the compliance assessment server.

4. The method of claim 1, further comprising the steps of:

transmitting the formatted loan data over a secure communication network to the compliance assessment server; and transmitting the audit result data over the secure communication network to the client loan origination system.

5. The method of claim 4, wherein the secure communication network is selected from the group consisting of a satellite communication network, a telephone communication network, a microwave transmission network, a radio communication network, a wireless telephone communication network, a cable network, and the Internet.

6. The method of claim 1, wherein the step of storing the audit result data comprises storing the audit result data in a results repository of the compliance assessment server and in a loan origination database of the loan origination system.

7. The method of claim 1, further comprising the step of displaying the audit result data on a user interface selected from the group consisting of a client loan origination system user interface, a customer user interface and a compliance assessment server user interface.

8. The method of claim 1, wherein the steps of extracting and converting comprises the steps of:

initiating manual and automatic audit assessment requests using a loan origination system user interface;

receiving the audit assessment request and extracting a loan data file from a loan origination system database;

converting and formatting the loan data file as an Extensible Markup Language XML file;

sending the formatted loan data file to a server processor for loan compliance assessment;

receiving an audit results file from the server processor;

parsing the audit results file and storing the audit results file in the loan origination system database; and displaying the parsed audit results file on the loan origination system user interface.

9. The method of claim 1, wherein the step of assessing compliance comprises the steps of:

receiving the formatted loan data in an input queue as a loan data file schema from a client side interface;

verifying the formatted loan data file schema and customer passwords;

validating a compliance review request;

conducting a rules assessment of the loan data file schema against applicable statutory rules stored in a rules repository;

conducting a license assessment of the loan data file against applicable license requirements stored in a license repository;

conducting an assessment of the loan data file against industry standards and guidelines stored in a supplemental data repository;

appending the assessment results to the loan data file to form an audit result file;

storing the audit result file in a results repository; and placing the audit result file in an output queue for sending to the client side interface.

10. The method of claim 1, further comprising the steps of:

creating license requirements for storing in a license repository; and creating statutory compliance rules requirements for storing in a rules repository.

11. The method of claim 10, wherein the step of creating license requirements comprises the steps of:

extracting licensing data compilations of applicable licenses and licensees from regulatory agencies;

converting the licensing data compilations into license XML files; and storing the indexed and referenced regulations, licensee data, license data and license XML files in the license repository.

12. The method of claim 10, wherein the step of creating statutory compliance rules requirements comprises the steps of:

extracting legal interpretations from documented sources of legal compliance;

creating rules from the legal interpretations expressed in plain English that reflect compliance requirements;

converting the English rules into computer system syntax rules comprising computer instructions representing mathematical equations and logical relationships; and storing the indexed and referenced documented sources of legal compliance, legal interpretations, English rules and system compliance rules in a rules repository.

13. A computer-readable medium containing instructions for controlling a computer system to implement the method of claim 1.

14. A computer-implemented method for automated loan compliance assessment, comprising the computer-implemented steps of:

extracting loan data from a client loan origination system;

converting and formatting the extracted loan data into compliance-based rule data elements for entry into computer-implemented compliance rules;

transmitting the formatted loan data to a compliance assessment server for assessing compliance of the formatted loan data with legal compliance requirements by applying the formatted loan data to the computer-implemented compliance rules comprising computer instructions representing mathematical equations and logical relationships to form an audit result data file;

receiving the audit result data file from the compliance assessment server; and storing and displaying the audit result data file designating rule compliance and rule noncompliance.

15. A computer-readable medium containing instructions for controlling a computer system to implement the method of claim 14.

16. A computer-implemented method for automated loan compliance assessment, comprising the computer-implemented steps of:

receiving an extracted loan data file from a client loan origination system;

converting and formatting the extracted loan data file into compliance-based rule data elements for entry into computer-implemented compliance rules;

assessing compliance of the formatted loan data file with legal compliance requirements by a compliance assessment server by applying the formatted loan data to the computer-implemented compliance rules comprising computer instructions representing mathematical equations and logical relationships to form audit result data;

storing the audit result data file designating rule compliance and rule noncompliance; and sending the audit result data file to the client loan origination system.

17. A computer-readable medium containing instructions for controlling a computer system to implement the method of claim 16.

18. A computer system for automated loan compliance assessment, comprising:

means for extracting loan data from a client loan origination system;

means for converting and formatting the extracted loan data into compliance-based rule data elements for entry into computer-implemented compliance rules;

means for assessing compliance of the formatted loan data with legal compliance requirements by a compliance assessment server by applying the formatted loan data to the computer-implemented compliance rules comprising computer instructions representing mathematical equations and logical relationships to form audit result data; and database means for storing the audit result data designating rule compliance and rule noncompliance.

19. The system of claim 18, wherein the means for extracting loan data and means for converting and formatting the extracted loan data comprises a client side interface.

20. The system of claim 19, wherein the client side interface comprises:

means for initiating manual and automatic audit assessment requests using a loan origination system user interface;

means for receiving the audit assessment request and extracting a loan data file from a loan origination system database;

means for converting and formatting the loan data file as an XML file;

means for sending the formatted loan data file to a server processor for loan compliance assessment;

means for receiving an audit results file from the server processor;

means for parsing the audit results file and storing the audit results file in the loan origination system database; and a loan origination system user interface means for displaying the parsed audit results file.

21. The system of claim 20, wherein the means for sending the formatted loan data file and the means for receiving an audit results file is a secure communication network selected from the group consisting of a satellite communication network, a telephone communication network, a microwave transmission network, a radio communication network, a wireless telephone communication network, a cable network, and the Internet.

22. The system of claim 18, wherein the means for assessing compliance comprises a server processor.

23. The system of claim 22, wherein the server processor comprises:

means for receiving the formatted loan data in an input queue as a loan data file from a client side interface;

means for verifying the formatted loan data file schema and customer passwords;

means for validating a compliance review request;

means for conducting a rules assessment of the loan data file against applicable statutory rules stored in a rules repository;

means for conducting a license assessment of the loan data file against applicable license requirements stored in a license repository;

means for conducting a review of the loan data file against industry standards and guidelines stored in a supplemental data repository for adding missing data;

means for appending the assessment results to the loan data file to form an audit result file;

results repository means for storing the audit result file; and means for placing the audit result file in an output queue for sending to the client side interface.

24. The system of claim 23, wherein the means for receiving the formatted loan data file and the means for sending the audit results file is a secure communication network selected from the group consisting of a satellite communication network, a telephone communication network, a microwave transmission network, a radio communication network, a wireless telephone communication network, a cable network, and the Internet.

25. The system of claim 23, wherein the means for conducting a rules assessment, a license assessment, and an industry standards and guidelines assessment comprises an expert system.

26. The system of claim 23, further comprising:

means for creating license requirements comprising computer instructions representing mathematical equations and logical relationships for storing in a license repository; and means for creating statutory compliance rules requirements comprising computer instructions representing mathematical equations and logical relationships for storing in a rules repository.

27. The system of claim 26, wherein the means for creating license requirements is a license data processor comprising:

means for extracting licensing data compilations of applicable licenses and licensees from regulatory agencies;

means for converting the licensing data compilations into license XML files; and license repository means for storing indexed and referenced regulations, licensee data, license data and license XML files.

28. The system of claim 26, wherein the means for creating statutory rules requirements is a legal rule builder comprising:

means for extracting legal interpretations from documented sources of legal compliance;

means for creating rules from the legal interpretations expressed in plain English that reflect compliance requirements;

means for converting the English rules into computer system syntax compliance rules comprising computer instructions representing mathematical equations and logical relationships; and rules repository means for storing the indexed and referenced documented sources of legal compliance, legal interpretations, English rules and system compliance rules.

29. A computer system for automated loan compliance assessment, comprising:

means for extracting loan data from a client loan origination system;

means for converting and formatting the extracted loan data into compliance-based rule data elements for entry into computer-implemented compliance rules;

means for transmitting the formatted loan data over a secure communication network to the compliance assessment server for assessing compliance of the formatted loan data with legal compliance requirements by applying the formatted loan data to the computer-implemented compliance rules comprising computer instructions representing mathematical equations and logical relationships to form an audit result data file;

means for receiving the audit result data file over the secure communication network from the client loan origination system; and means for storing and displaying the audit result data file designating rule compliance and rule noncompliance.

30. A computer system for automated loan compliance assessment, comprising:

means for receiving an extracted loan data file from a client loan origination system;

means for converting and formatting the extracted loan data file into compliance-based rule data elements for entry into computer-implemented compliance rules;

means for assessing compliance of the formatted loan data file with legal compliance requirements by a compliance assessment server by applying the formatted loan data to the computer-implemented compliance rules comprising computer instructions representing mathematical equations and logical relationships to form audit result data;

means for storing the audit result data file; and means for sending the audit result data file designating rule compliance and rule noncompliance to the client loan origination system.

31. A computer implemented method for displaying automated loan compliance assessment information, comprising the computer-implemented steps of:

displaying a tool bar having selectable tool bar title buttons, at least one of the selectable tool bar title buttons for selecting an audit search;

positioning a cursor over the audit search tool bar title button for displaying a drop-down menu having selections of audit search type, at least one of the selections for searching by loan number;

designating the audit search type by selecting the search by loan number selection for displaying a loan number window and a customer selection window;

receiving a loan number into the loan number window and a customer selection in the customer selection window; and displaying automated loan compliance assessment information designating rule compliance and rule noncompliance for the selected loan number and customer.

32. The method of claim 31, wherein:

the positioning step comprises positioning a cursor over the audit search tool bar title button for displaying a drop-down menu having selections of audit search type, at least one of the selections for advanced searching;

the designating step comprises designating the audit search type by selecting the advanced search selection for displaying a loan number window, a branch selection window, an application date window, a submit date window, a loan status window, an audit status selection window and a customer selection window;

the receiving step comprises entering data into one of the displayed; and the displaying automated loan step comprises viewing a displayed list of audits that match the data entered into the selected displayed window.

33. The method of claim 31, further comprising:
displaying a tool bar having selectable tool bar title buttons, at least one of the selectable tool bar title buttons for selecting a jurisdiction display;
positioning a cursor over the jurisdiction tool bar title button and selecting the jurisdiction tool bar title button; and
displaying a list of jurisdictions where automated loan compliance assessment may be conducted.

34. The method of claim 31, further comprising:
displaying a tool bar having selectable tool bar title buttons, at least one of the selectable tool bar title buttons for selecting an agency display;
positioning a cursor over the agency tool bar title button and selecting the agency tool bar title button; and
displaying a list of jurisdictions and associated agencies for regulating loan compliance.

35. The method of claim 31, further comprising:
displaying a tool bar having selectable tool bar title buttons, at least one of the selectable tool bar title buttons for selecting an act display;
positioning a cursor over the act tool bar title button and selecting the act tool bar title button; and
displaying a list of jurisdictions and associated acts for regulating loan compliance.

36. The method of claim 31, further comprising:
displaying a tool bar having selectable tool bar title buttons, at least one of the selectable tool bar title buttons for selecting a license display;
positioning a cursor over the license tool bar title button and selecting the license tool bar title button; and
displaying a list of jurisdictions and associated licenses required by personnel and entities engaged in loan processing activities.

37. The method of claim 31, further comprising:
displaying a tool bar having selectable tool bar title buttons, at least one of the selectable tool bar title buttons for selecting a tag display;

positioning a cursor over the tag tool bar title button and selecting the tag tool bar title button; and
displaying a list of tag names, tag descriptions and tag types used in loan compliance assessment.

38. The method of claim 31, further comprising:
displaying a tool bar having selectable tool bar title buttons, at least one of the selectable tool bar title buttons for selecting a rule display;
positioning a cursor over the rule tool bar title button and selecting the rule tool bar title button; and
displaying a list of rules used in loan compliance assessment.

39. The method of claim 31, further comprising:
displaying a tool bar having selectable tool bar title buttons, at least one of the selectable tool bar title buttons for selecting a rule header display;
positioning a cursor over the rule header tool bar title button and selecting the rule header tool bar title button; and
displaying a list of rule headers used in loan compliance assessment.

40. The method of claim 31, further comprising:
displaying a tool bar having selectable tool bar title buttons, at least one of the selectable tool bar title buttons for selecting a reports display;
positioning a cursor over the reports tool bar title button for displaying a drop-down menu having a selection of report types, the selection of report types including broker license exception, covered loan exception, daily exception, error exception, fee exception, geocode exception, high cost exception, Home Mortgage Disclosure Act HMDA exception, lender license exception, SDS exception, and state rule exception;
designating the report type to be displayed by selecting a report type for displaying a date window and a customer selection window;
receiving a date into the date window and a customer designation in the customer selection window; and
displaying the designated report type.

41. The method of claim 31, further comprising:
displaying a tool bar having selectable tool bar title buttons, at least one of the selectable tool bar title buttons for selecting an administration display;
positioning a cursor over the administration tool bar title button for displaying a drop-down menu having selections of user setup and user role setup;
designating a user setup to be displayed by selecting the user setup selection; and
displaying a designated user setup comprising a displayed list of user full names, user login names, user company names, user roles, and user status.

42. The method of claim 31, further comprising:
displaying a tool bar having selectable tool bar title buttons, at least one of the selectable tool bar title buttons for selecting an administration display;
positioning a cursor over the administration tool bar title button for displaying a drop-down menu having selections of user setup and user role setup;
designating a user role setup to be displayed by selecting the role setup selection; and
displaying a designated user role setup comprising a displayed list of user role names and associated descriptions.

* * * * *